(12) United States Patent
Yasuda et al.

(10) Patent No.: US 11,155,730 B2
(45) Date of Patent: Oct. 26, 2021

(54) SOLVENT-FREE VARNISH COMPOSITION, INSULATED COIL, PROCESS FOR PRODUCING SAME, ROTATING MACHINE, AND CLOSED ELECTRIC COMPRESSOR

(71) Applicant: MITSUBISHI ELECTRIC CORPORATION, Chiyoda-ku (JP)

(72) Inventors: Naoki Yasuda, Chiyoda-ku (JP); Shigeyuki Yamamoto, Chiyoda-ku (JP); Toshifumi Kanri, Chiyoda-ku (JP); Takahiro Tsutsumi, Chiyoda-ku (JP); Masashi Ono, Chiyoda-ku (JP); Kosuke Sano, Sanda (JP); Yukio Hidaka, Sanda (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 186 days.

(21) Appl. No.: 15/761,140

(22) PCT Filed: Oct. 8, 2015

(86) PCT No.: PCT/JP2015/078635
§ 371 (c)(1),
(2) Date: Mar. 19, 2018

(87) PCT Pub. No.: WO2017/061006
PCT Pub. Date: Apr. 13, 2017

(65) Prior Publication Data
US 2018/0258313 A1  Sep. 13, 2018

(51) Int. Cl.
*C09D 163/00* (2006.01)
*H02K 3/30* (2006.01)
(Continued)

(52) U.S. Cl.
CPC ......... *C09D 163/00* (2013.01); *C08G 59/00* (2013.01); *C08G 59/68* (2013.01); *C08L 33/04* (2013.01);
(Continued)

(58) Field of Classification Search
CPC .... C09D 163/00; C09D 163/10; C08G 59/68; C08G 59/00; C08G 59/1466; C08L 33/04;
(Continued)

(56) References Cited

U.S. PATENT DOCUMENTS 5,984,647 A 11/1999 Miyamoto et al.
2010/0222520 A1 9/2010 Tamai et al.

FOREIGN PATENT DOCUMENTS

JP 53-58537 5/1978
JP 54-83966 A 7/1979
(Continued)

OTHER PUBLICATIONS

Sartomer Product page accessed on Sep. 11, 2020 at https://emea.sartomer.com/en/products/specialty-acrylates-resins/monomers-acrylates/.*
(Continued)

*Primary Examiner* — Robert S Walters, Jr.
(74) *Attorney, Agent, or Firm* — Xsensus LLP

(57) ABSTRACT

The present invention provides a solvent-free varnish composition, including: a thermosetting resin (A) having two or more (meth)acryloyl groups in a molecule thereof; a thermosetting resin (B) having one or more epoxy groups in a molecule thereof; a monofunctional vinyl-based monomer having an ether bond or an ester bond; an organic peroxide having a 10-hour half-life temperature of 40° C. or more; and a curing catalyst for an epoxy resin, in which a mixed resin of the thermosetting resin (A) and the thermosetting
(Continued)

resin (B) has an epoxy equivalent of from 500 to 5,000. The solvent-free varnish composition can be used as an insulating varnish that shows a small energy loss and requires a short curing time in its curing treatment step, and that provides a cured product that barely causes the precipitation of an oligomer or the like even when exposed to a refrigerant-based environment containing a refrigerant and a refrigerating machine oil under high temperature and high pressure.

14 Claims, 2 Drawing Sheets

(51) Int. Cl.
*H02K 15/12* (2006.01)
*C08L 63/00* (2006.01)
*C08G 59/00* (2006.01)
*H02K 3/44* (2006.01)
*C09D 163/10* (2006.01)
*H01B 3/40* (2006.01)
*C08L 33/04* (2006.01)
*C08G 59/68* (2006.01)
*H02K 7/14* (2006.01)
*C08G 59/17* (2006.01)
*C08J 3/24* (2006.01)
*C08K 5/14* (2006.01)

(52) U.S. Cl.
CPC ............ *C08L 63/00* (2013.01); *C09D 163/10* (2013.01); *H01B 3/40* (2013.01); *H02K 3/30* (2013.01); *H02K 3/44* (2013.01); *H02K 15/12* (2013.01); *C08G 59/1466* (2013.01); *C08J 3/24* (2013.01); *C08K 5/14* (2013.01); *H02K 7/14* (2013.01)

(58) Field of Classification Search
CPC . C08L 63/00; H01B 3/40; H02K 3/30; H02K 3/44; H02K 15/12; H02K 7/14; C08J 3/24; C08K 5/14
See application file for complete search history.

(56) References Cited

FOREIGN PATENT DOCUMENTS

| JP | 10-60084 A | 3/1998 |
|---|---|---|
| JP | 10-285886 A | 10/1998 |
| JP | 2000-44636 A | 2/2000 |
| JP | 2006-24917 A | 1/2006 |
| JP | 2006-131868 A | 5/2006 |
| JP | 2006-265483 A | 10/2006 |
| JP | 2007-133232 A | 5/2007 |
| JP | 2007/074890 A1 | 7/2007 |
| JP | 2015-4056 A | 1/2015 |

OTHER PUBLICATIONS

Pal et al. "Studies on the Effect of Epoxide Equivalent Weight of Epoxy Resins on Thermal, Mechanical, and Chemical Characteristics of Vinyl Ester Resins" Journal of Applied Polymer Science vol. 117, Issue 4, 2010, pp. 2406-2412.*
International Search Report dated Dec. 15, 2015 in PCT/JP2015/078635, filed on Oct. 8, 2015.

* cited by examiner

1

SOLVENT-FREE VARNISH COMPOSITION, INSULATED COIL, PROCESS FOR PRODUCING SAME, ROTATING MACHINE, AND CLOSED ELECTRIC COMPRESSOR

TECHNICAL FIELD

The present invention relates to a solvent-free varnish composition to be used as an insulating varnish, an insulated coil produced by using the solvent-free varnish composition and a method of producing the coil, a rotating machine, and a closed electric compressor.

BACKGROUND ART

The coil of rotating machines, such as motors, generators, or compressors, is subjected to impregnation treatment with an insulating varnish in order that the insulating property of a coil portion formed by winding enameled wires around an iron core may be retained and the mechanical strength thereof may be maintained. A low-viscosity resin (e.g., a solvent-based varnish obtained by dissolving, for example, an epoxy resin or a phenol resin in an organic solvent, or a solvent-free varnish, such as a polyester-based resin, using styrene as a reactive diluent) has been widely used as the insulating varnish because the insulating varnish needs to impregnate the gaps between the enameled wires of the coil portion (see, for example, Patent Documents 1 and 2).

However, in the related-art solvent-based varnishes and solvent-free varnishes, large amounts of organic components volatilize during a curing treatment step after the impregnation. In particular, solvent-based varnishes involve problems in terms of safety and health, and problems in terms of odor derived from large amounts of the volatile organic components. In addition, irrespective which one of the varnishes is used, in addition to the curing reaction of a resin during the curing treatment step, the volatilization of an organic component that is not involved in the curing reaction advances. Accordingly, there is a problem in that energy loss in heating furnaces increase and hence curing times become longer. As the treatment time in a heating furnace becomes longer, the amount of $CO_2$ emissions increases. In today's circumstances where regulations in terms of the environment are advanced, this increase is a large problem.

A closed electric compressor to be used in a refrigerating/air-conditioning apparatus, such as a refrigerator or an air conditioner, has, for example, such a structure as illustrated in each of the partial schematic explanatory views of FIG. 1A and FIG. 1B, and a schematic explanatory view of FIG. 2. A motor element 2 formed of a stator and a rotor, and a compression element 3 driven by the motor element 2 are arranged in a closed vessel 1, and a refrigerating machine oil 4 is stored in the bottom portion of the closed vessel 1. The motor element 2 is formed of the stator whose outer peripheral portion is fixed to the closed vessel 1, and the rotor that is supported so as to keep a certain gap from the inner peripheral surface of the stator and that is coupled to the compression element 3 by a crankshaft 5, and a magnet wire 6 arranged in the stator is coupled to a compression power terminal 7, which is arranged on the closed vessel 1, so that electric power may be supplied thereto. As illustrated in FIG. 1A and FIG. 1B, the stator includes: a core 8 obtained by laminating iron plates in a cylindrical manner; the magnet wire 6 passing the insides of slots 9 formed in a large number in an axial direction in the inner peripheral surface of the core 8; insulating films 10 between the core 8 and the magnet wire 6, and between layers in the magnet wire 6; and a binding thread 11 to be used for the binding of the magnet wire 6. Further, the magnet wire 6 is subjected to an impregnation treatment with an insulating varnish 12 in order that its insulating performance may be improved. A cured product of the insulating varnish 12 is exposed to a refrigerant-based environment containing a fluorocarbon (refrigerant) and the refrigerating machine oil, and is hence required to be excellent in resistance to such refrigerant-based environment (e.g., its mechanical strength is maintained and its extractability into a refrigerant system is low).

In view of the problem of regulation of chlorofluorocarbons originating from ozone layer depletion, switching to a hydrofluorocarbon free of any chlorine atoms in the molecules thereof (e.g., R-134a, R-125, R-22, R-23, R-32, R-152a, R-407c, R-404a, or R-410a) serving as an alternative refrigerant has been advanced. Alternative refrigerating machine oils having high polarity, such as a polyalkylene glycol-, ester-, or ether-based refrigerating machine oil, are starting to be used as refrigerating machine oils in order that compatibility with such hydrofluorocarbons having high polarity may be secured.

Here, during the operation of the closed electric compressor, the motor element 2 is always exposed to the refrigerant-based environment containing the refrigerant and the refrigerating machine oil under high temperature and high pressure. The mixed liquid has extremely high polarity, and hence organic materials, such as the insulting films 10 and the binding thread 11 forming the stator of the conventional motor element 2, and the cured product of the insulating varnish 12, may deteriorate or be eluted. As a result, there occurs a problem in that abnormality may occur in a part in the closed electric compressor or the insulation deterioration of the compressor may occur.

In particular, the cured product of the related-art insulating varnish 12 is formed by using a monomer having low polarity, such as styrene, and hence compatibility between an extract extracted from the cured product of the insulating varnish 12 and the alternative refrigerating machine oil is low. Accordingly, the following problem occurs. The precipitation of an oligomer or the like occurs in the refrigerant-based environment containing the refrigerant and the refrigerating machine oil, and the oligomer or the like is deposited as sludge in a restricting portion, such as a capillary tube or an expansion valve, in a refrigeration/air-conditioning cycle, and hence the clogging of the restricting portion occurs owing to long-term operation.

Therefore, an insulating varnish 12 that shows a small energy loss and requires a short curing time in its curing treatment step, and that provides a cured product that barely causes the precipitation of the oligomer or the like even when exposed to the mixed liquid of the refrigerant and the refrigerating machine oil under high temperature and high pressure has been desired.

In view of the foregoing, in order to solve such problems as described above, in Patent Document 3, there is a proposal to use a solvent-free varnish composition, which contains a thermosetting resin having two or more (meth) acryloyl groups in a molecule thereof, a vinyl-based monomer having an ether bond or an ester bond, and an organic peroxide, as an insulating varnish.

CITATION LIST

Patent Document

Patent Document 1: Japanese Patent Application Laid-Open No. 10-60084
Patent Document 2: Japanese Patent Application Laid-Open No. 2000-44636
Patent Document 3: Japanese Patent No. 3405653

SUMMARY OF THE INVENTION

Technical Problem

However, the solvent-free varnish composition of Patent Document 3 is cured by the polymerization of the (meth) acryloyl groups of the thermosetting resin and the vinyl group of the vinyl-based monomer in the presence of the organic peroxide serving as a reaction initiator. The curing (polymerization) reaction is caused by a radical polymerization reaction in which an unsaturated bond group is involved, and hence an improvement in curing rate is limited even when the optimization of a component to be blended and a change in kind thereof are performed.

The present invention has been made to solve such problems as described above, and an object of the present invention is to provide a solvent-free varnish composition that can be used as an insulating varnish that shows a small energy loss and requires a short curing time in its curing treatment step, and that provides a cured product that barely causes the precipitation of an oligomer or the like even when exposed to a refrigerant-based environment containing a refrigerant and a refrigerating machine oil under high temperature and high pressure.

Another object of the present invention is to provide an insulated coil that barely causes the precipitation of an oligomer or the like even when exposed to a refrigerant-based environment containing a refrigerant and a refrigerating machine oil under high temperature and high pressure, and a method of producing the coil.

Still another object of the present invention is to provide a rotating machine and a closed electric compressor each having high reliability, the rotating machine and the closed electric compressor each barely causing insulation deterioration, and each being capable of suppressing the clogging of a restricting portion, such as a capillary tube or an expansion valve.

Solution to the Problem

The inventors of the present invention have made extensive investigations with a view to solving such problems as described above, and as a result, have found that when two kinds of thermosetting resins each having a specific functional group are combined with a specific monofunctional vinyl-based monomer, a organic peroxide, and a curing catalyst for an epoxy resin, a crosslinking (polymerization) reaction between the two kinds of thermosetting resins efficiently advances to significantly improve a curing rate, and a cured product having a physical property suitable for an insulating varnish is obtained. Thus, the inventors have completed the present invention.

That is, according to one embodiment of the present invention, there is provided a solvent-free varnish composition, including: a thermosetting resin (A) having two or more (meth)acryloyl groups in a molecule thereof; a thermosetting resin (B) having one or more epoxy groups in a molecule thereof; a monofunctional vinyl-based monomer having an ether bond or an ester bond; an organic peroxide having a 10-hour half-life temperature of 40° C. or more; and a curing catalyst for an epoxy resin, in which a mixed resin of the thermosetting resin (A) and the thermosetting resin (B) has an epoxy equivalent of from 500 to 5,000.

According to another embodiment of the present invention, there is provided an insulated coil, which is produced by using the solvent-free varnish composition.

According to another embodiment of the present invention, there is provided a method of producing an insulated coil, including: impregnating a cyclic coil with the solvent-free varnish composition; and heating the resultant at from 130° C. to 180° C. to cure the composition.

According to another embodiment of the present invention, there is provided a rotating machine, including the insulated coil.

According to another embodiment of the present invention, there is provided a closed electric compressor to be used in a refrigerating/air-conditioning apparatus using a refrigerant containing a hydrofluorocarbon as a main component or a refrigerant containing a natural refrigerant as a main component, the closed electric compressor including: a closed vessel; a motor element and a compression element driven by the motor element, the elements being housed in the closed vessel; and a refrigerating machine oil stored in a bottom portion of the closed vessel, in which the motor element includes a stator including the insulated coil.

Advantageous Effects of the Invention

According to the present invention, the solvent-free varnish composition that can be used as an insulating varnish that shows a small energy loss and requires a short curing time in its curing treatment step, and that provides a cured product that barely causes the precipitation of an oligomer or the like even when exposed to a refrigerant-based environment containing a refrigerant and a refrigerating machine oil under high temperature and high pressure can be provided.

According to the present invention, the insulated coil that barely causes the precipitation of an oligomer or the like even when exposed to a refrigerant-based environment containing a refrigerant and a refrigerating machine oil under high temperature and high pressure, and the method of producing the coil can also be provided.

According to the present invention, the rotating machine and the closed electric compressor each having high reliability, the rotating machine and the closed electric compressor each barely causing insulation deterioration, and each being capable of suppressing the clogging of a restricting portion, such as a capillary tube or an expansion valve can also be provided.

BRIEF DESCRIPTION OF THE DRAWINGS

FIG. 1A and FIG. 1B contain partial schematic explanatory views of a closed electric compressor, in which FIG. 1A is a plan view and FIG. 1B is a side view.

DESCRIPTION OF EMBODIMENTS

Embodiment 1

Figure 1A:
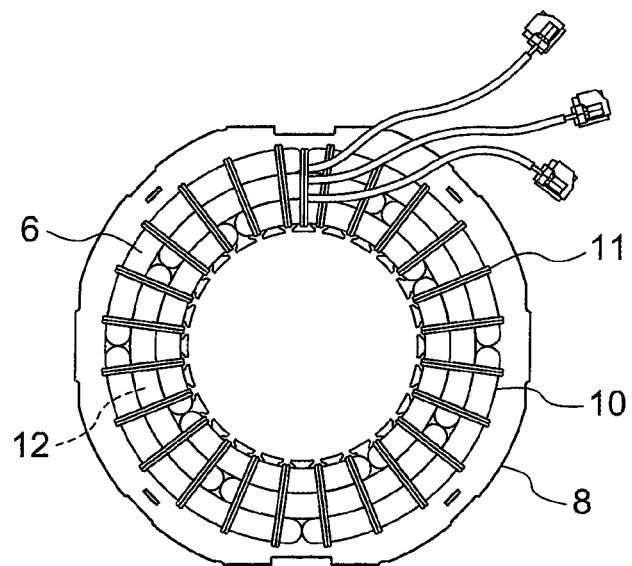

A solvent-free varnish composition according to one embodiment of the present invention contains: a thermosetting resin (A) having two or more (meth)acryloyl groups in a molecule thereof; a thermosetting resin (B) having one or more epoxy groups in a molecule thereof; a monofunctional vinyl-based monomer having an ether bond or an ester bond; an organic peroxide having a 10-hour half-life temperature of 40° C. or more; and a curing catalyst for an epoxy resin. In addition, the solvent-free varnish composition of this embodiment further contains a polyfunctional vinyl-based monomer having two or more (meth)acryloyl groups or allyl groups in a molecule thereof as required.

The curing of the thermosetting resin (A) advances as follows: an addition reaction occurs in an unsaturated bond moiety ((meth)acryloyl group) of the thermosetting resin (A) through a free radical produced from the organic peroxide to cause the polymerization. The curing of the thermosetting resin (B) advances as follows: in addition to the addition reaction with the thermosetting resin (A) through the free radical, the ring-opening addition polymerization of an epoxy group simultaneously advances by virtue of the presence of the curing catalyst for an epoxy resin to cause the polymerization. The two kinds of reaction active groups (the unsaturated bond moiety and the epoxy group) of the thermosetting resins (A) and (B) efficiently advance three-dimensional crosslinking between the thermosetting resin (A) and the thermosetting resin (B), and hence a crosslink density increases in a short time period (i.e., the curing rate significantly increases).

In addition, the pot life of the solvent-free varnish composition of this embodiment depends mainly on the addition reaction through the free radical produced from the organic peroxide. Accordingly, even the blending of the thermosetting resin (B) and the curing catalyst for an epoxy resin has a small influence on the pot life. Therefore, the curing rate of the solvent-free varnish composition of this embodiment can be increased while the pot life is secured.

The thermosetting resin (A) is not particularly limited as long as the resin has two or more (meth)acryloyl groups as reaction active groups in a molecule thereof. Examples of the thermosetting resin (A) include an epoxy (meth)acrylate resin (vinyl ester-based resin), a urethane (meth)acrylate resin, a polyether (meth)acrylate resin, and a polyester (meth)acrylate resin. Those thermosetting resins may be used alone or as a mixture thereof.

Herein, the term "epoxy (meth)acrylate resin" means a resin obtained through the addition reaction of (meth)acrylic acid and an epoxy compound, and resins having different physical properties may be obtained by changing the kind of epoxy compound, a modification ratio in the addition of (meth)acrylic acid, and the like. An example of the epoxy compound is a compound having a bisphenol A-type, bisphenol E-type, bisphenol F-type, hydrogenated phthalic acid-type, cresol novolac-type, phenol novolac-type, resorcin-type, TECHMORE-type, or polyphenylene ether-type skeleton.

The term "urethane (meth)acrylate resin" means a resin obtained by urethanating an isocyanate compound, a polyol compound, and a hydroxyl group-containing acrylic monomer, and resins having different physical properties may be obtained by changing, for example, the kinds of compounds to be combined and the number of functional groups of a (meth)acrylate.

The term "polyether (meth)acrylate resin" means a chain polymer having an ether bond (—C—O—C) in a main chain thereof and having a (meth)acryloyl group at a terminal thereof.

The term "polyester (meth)acrylate resin" means a saturated polyester obtained by subjecting a saturated dibasic acid and a polyhydric alcohol to a condensation reaction, or an unsaturated polyester obtained by subjecting an α,β-unsaturated dibasic acid and a polyhydric alcohol to a condensation reaction, the polyesters each having a (meth)acryloyl group at a terminal thereof.

Of the various thermosetting resins (A), an epoxy (meth)acrylate resin is preferred as the thermosetting resin (A) because the resin is excellent in hydrolysis resistance, mechanical strength, and heat resistance. In particular, a bisphenol A-type epoxy (meth)acrylate resin, a bisphenol E-type epoxy (meth)acrylate resin, a bisphenol F-type epoxy (meth)acrylate resin, amine-modified resins and fatty acid-modified resins thereof, and compounds represented by the following general formulae (I) to (III) are more preferred because the resins each have a relatively low viscosity.

In addition, in the solvent-free varnish composition of this embodiment, a compound having a weight-average molecular weight (Mw) of preferably 15,000 or less, more preferably from 1,000 to 10,000, and a viscosity at 60° C. of 10,000 mPa·s or less is desirably used as the thermosetting resin (A) in terms of the ease with which the viscosity of the composition is adjusted. The thermosetting resins (A) each having such characteristic may be used alone or in combination thereof.

The compound represented by the general formula (I) is as described below.

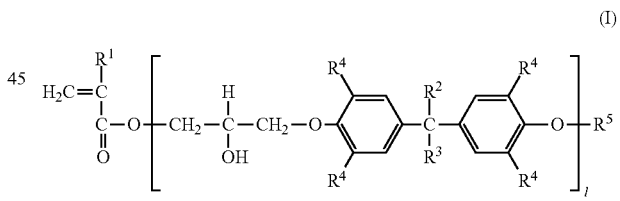

In the general formula (I), $R^1$, $R^2$, and $R^3$ each independently represent H or $CH_3$, $R^4$ represents H or Br, $R^5$ represents a group represented by the general formula (i), and l represents an integer of from 1 to 50.

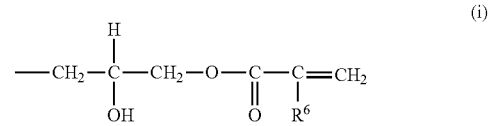

In the general formula (i), $R^6$ represents H or $CH_3$. The compound represented by the general formula (II) is as described below.

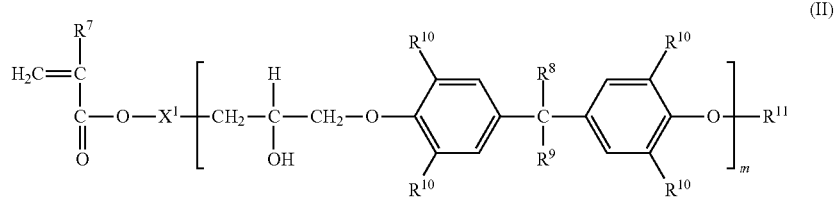
(II)

In the general formula (II), $R^7$, $R^8$, and $R^9$ each independently represent H or $CH_3$, $R^{10}$ represents H or Br, $R^{11}$ represents a group represented by the general formula (ii), $X^1$ represents a divalent group having 1 to 20 carbon atoms and 0 to 6 oxygen atoms, the divalent group containing at least one group selected from the group consisting of an aromatic hydrocarbon group, a saturated or unsaturated alicyclic hydrocarbon group, and a linear or branched, saturated or unsaturated aliphatic hydrocarbon group, and m represents an integer of from 1 to 50.

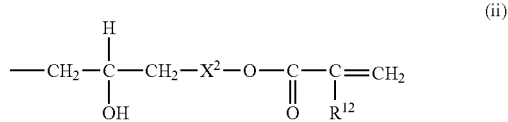
(ii)

In the general formula (ii), $R^{12}$ represents H or $CH_3$, and $X^2$ represents a divalent group having 1 to 20 carbon atoms and 0 to 6 oxygen atoms, the divalent group containing at least one group selected from the group consisting of an aromatic hydrocarbon group, a saturated or unsaturated alicyclic hydrocarbon group, and a linear or branched, saturated or unsaturated aliphatic hydrocarbon group.

The compound represented by the general formula (III) is as described below.

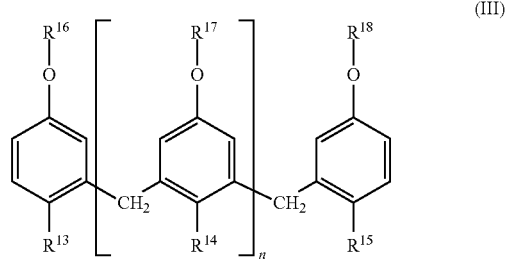
(III)

In the general formula (III), $R^{13}$, $R^{14}$, and $R^{15}$ each independently represent H or $CH_3$, $R^{16}$, $R^{17}$, and $R^{18}$ each represent a group represented by the general formula (i) or (ii), and n represents an integer of from 1 to 50.

The thermosetting resin (B) is not particularly limited as long as the resin has one or more epoxy groups as reaction active groups in a molecule thereof. In addition, when the thermosetting resin (B) further having a (meth)acryloyl group as a reaction active group except an epoxy group is used, an addition reaction occurs not only in the (meth) acryloyl group of the thermosetting resin (A) but also in the (meth)acryloyl group of the thermosetting resin (B) through a free radical produced from the organic peroxide. Accordingly, a three-dimensional crosslinking reaction by both the thermosetting resin (A) and the thermosetting resin (B) is accelerated, and hence the heat resistance and mechanical strength of a cured product can be improved. Therefore, in order that the curing rate of the solvent-free varnish composition of this embodiment may be improved, the thermosetting resin (B) preferably has both an epoxy group and a (meth)acryloyl group in a molecule thereof.

Of the various thermosetting resins (B), a resin having the same skeleton as that of any one of the compounds represented by the general formulae (I) to (III), and having one or more epoxy groups in side chains thereof is preferred as the thermosetting resin (B) because the resin is excellent in hydrolysis resistance, mechanical strength, and heat resistance, and from the viewpoint of its compatibility with the thermosetting resin (A). Such resins may be represented by the following general formulae (IV) to (V).

In addition, in the solvent-free varnish composition of this embodiment, a resin having a weight-average molecular weight (Mw) of preferably 15,000 or less, more preferably from 1,000 to 10,000, and a viscosity at 60° C. of 10,000 mPa·s or less is desirably used as the thermosetting resin (B) in terms of the ease with which the viscosity of the composition is adjusted. The thermosetting resins (B) each having such characteristic may be used alone or in combination thereof.

The resin represented by the general formula (IV) is as described below.

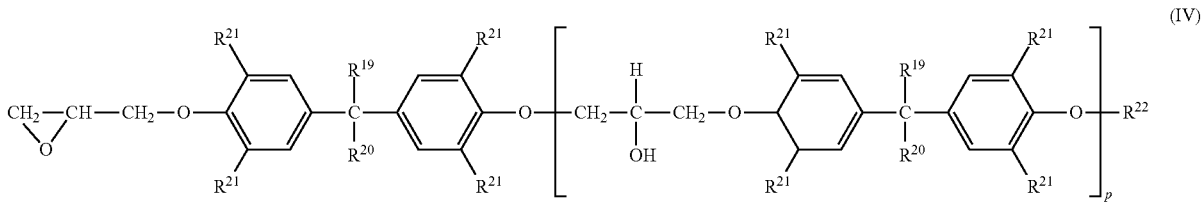
(IV)

In the general formula (IV), $R^{19}$ and $R^{20}$ each independently represent H or $CH_3$, $R^{21}$ represents H or Br, $R^{22}$ represents a group represented by the general formula (i) or (ii), or an epoxy group represented by the formula (iii), and p represents an integer of from 0 to 50. The epoxy group represented by the formula (iii) is as described below.

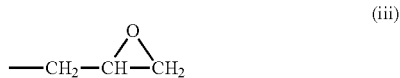

(iii)

The resin represented by the general formula (V) is as described below.

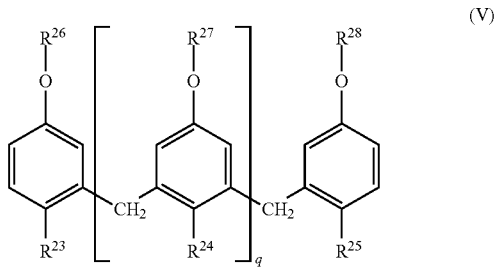

(V)

In the general formula (V), $R^{23}$, $R^{24}$, and $R^{25}$ each independently represent H or $CH_3$, $R^{26}$, $R^{27}$, and $R^{28}$ each represent a group represented by the general formula (i) or (ii), or an epoxy group represented by the formula (iii), and at least one of $R^{26}$, $R^{27}$, or $R^{28}$ represents an epoxy group represented by the formula (iii), and q represents an integer of from 1 to 50.

When the structures of the main chain skeletons of the thermosetting resin (A) and the thermosetting resin (B) are made identical to each other, the compatibility between the thermosetting resin (A) and the thermosetting resin (B) can be improved. Therefore, a combination of the thermosetting resin (A) represented by the general formula (I) or (II) and the thermosetting resin (B) represented by the general formula (IV), and a combination of the thermosetting resin (A) represented by the general formula (III) and the thermosetting resin (B) represented by the general formula (V) are particularly preferably used. The use of any such combination improves the compatibility between the thermosetting resin (A) and the thermosetting resin (B), and hence can provide a uniform solvent-free varnish composition.

The epoxy equivalent of a thermosetting resin (mixed resin of the thermosetting resin (A) and the thermosetting resin (B)) to be blended into the solvent-free varnish composition of this embodiment is 500 or more, preferably 1,000 or more. When the epoxy equivalent is controlled within the range, the curing rate of the solvent-free varnish composition can be improved without the shortening of its pot life. Further, the crosslink density of the cured product can be improved, and hence the extraction amount of an extract produced from the cured product when the cured product is exposed to a refrigerant-based environment can be reduced. In addition, an upper limit for the epoxy equivalent is 5,000 or less, preferably 4,000 or less. When the epoxy equivalent is more than 5,000, the frequency at which the ring-opening addition polymerization of an epoxy group occurs increases, and hence the extraction amount of the extract increases.

The organic peroxide is used as a reaction initiator. The organic peroxide is not particularly limited as long as its 10-hour half-life temperature is 40° C. or more, and an organic peroxide known in the art may be used. As the organic peroxide, there may be used, for example, a ketone peroxide-based, peroxyketal-based, hydroperoxide-based, dialkyl peroxide-based, diacyl peroxide-based, peroxyester-based, or peroxydicarbonate-based peroxide. Those organic peroxides may be used alone or as a mixture thereof.

In addition, a treatment in which the solvent-free varnish composition is impregnated into a coil is typically performed in a room temperature atmosphere at less than 40° C. Accordingly, when an organic peroxide having a high active temperature is selected as the organic peroxide having a role of initiating the polymerization reaction, the pot life of the solvent-free varnish composition can be improved. Accordingly, the 10-hour half-life temperature of the organic peroxide is preferably 80° C. or more from the viewpoint of securing the pot life of the solvent-free varnish composition suitable for the impregnation treatment into the coil. In addition, in order that the curing of the solvent-free varnish composition may be efficiently advanced, the 10-hour half-life temperature of the organic peroxide is preferably equal to or less than the set temperature of a curing furnace at the time of the curing of the solvent-free varnish composition. Examples of the organic peroxide having such 10-hour half-life temperature include 1,1-di(t-butylperoxy)cyclohexane, 1,1-di(t-hexylperoxy)cyclohexane, 1,1-di(t-hexylperoxy)-3,3,5-trimethylcyclohexane, 1,1-di(t-butylperoxy)-2-methylcyclohexane, 2,2-di(4,4-di-(butylperoxy)cyclohexyl)propane, n-butyl 4,4-di-(t-butylperoxy)valerate, 2,2-di-(t-butylperoxy)butane, t-hexyl peroxy isopropyl monocarbonate, t-butyl peroxymaleate, t-butyl peroxy-3,5,5-trimethyl hexanoate, t-butyl peroxylaurate, t-butyl peroxy isopropyl monocarbonate, t-butyl peroxybenzoate, t-butyl peroxyacetate, t-hexyl peroxybenzoate, 2,5-dimethyl-2,5-di(benzoylperoxy)hexane, t-butylperoxy 2-ethylhexyl monocarbonate, di(2-t-butylperoxyisopropyl)benzene, dicumyl peroxide, di-t-hexyl peroxide, 2,5-dimethyl-2,5-di(t-butylperoxy)hexane, di-t-hexyl peroxide, t-butyl cumyl peroxide, di-t-butyl peroxide, 2,5-dimethyl-2,5-di(t-butylperoxy)hexyne-3, p-menthane hydroperoxide, t-butyl peroxy allyl monocarbonate, methyl ethyl ketone peroxide, 1,1,3,3-tetramethylbutyl hydroperoxide, t-butyl hydroperoxide, cumene hydroperoxide, and diisopropylbenzene hydroperoxide. Those organic peroxides may be used alone or as a mixture thereof.

The blending amount of the organic peroxide in the solvent-free varnish composition of this embodiment, which is not particularly limited, is preferably from 0.1 part by mass to 10 parts by mass, more preferably from 0.5 part by mass to 5 parts by mass with respect to 100 parts by mass of the total of the thermosetting resin (A) and the thermosetting resin (B), and an (optional polyfunctional vinyl-based monomer). When the blending amount of the organic peroxide is less than 0.1 part by mass, the crosslink density reduces and hence the solvent resistance of the cured product reduces (the extraction amount of the extract produced from the cured product when the cured product is exposed to a refrigerant-based environment increases) in some cases. Further, when the blending amount of the organic peroxide is more than 10 parts by mass, the pot life of the solvent-free varnish composition tends to remarkably shorten.

The curing catalyst for an epoxy resin has an action of causing the ring-opening polymerization of an epoxy group of the thermosetting resin (B). The curing catalyst for an epoxy resin is not particularly limited as long as the catalyst has the action, and a curing catalyst known in the art may be used. Examples of the curing catalyst for an epoxy resin include a tertiary amine, a tertiary amine salt, a borate, a Lewis acid, an organometallic compound, an organic phosphorus-based compound, a quaternary ammonium salt, a quaternary phosphonium salt, an amine complex, an imidazole-based compound, and a compound containing a transition metal, such as titanium or cobalt. Those curing catalysts may be used alone or as a mixture thereof.

Examples of the tertiary amine include lauryldimethylamine, N,N-dimethylcyclohexylamine, N,N-dimethylbenzylamine, N,N-dimethylaniline, (N,N-dimethylaminomethyl)phenol, 2,4,6-tris(N,N-dimethylaminomethyl)phenol, 1,8-diazabicyclo[5.4.0]undecene-7 (DBU), and 1,5-diazabicyclo[4.3.0]nonene-5 (DBN).

Examples of the tertiary amine salt include carboxylates, sulfonates, and inorganic acid salts of the above-mentioned tertiary amines. Examples of the carboxylates include salts of carboxylic acids each having 1 to 30 carbon atoms (in particular, 1 to 10 carbon atoms) (in particular, salts of fatty acids), such as an octylate. Examples of the sulfonates include a p-toluenesulfonate, a benzenesulfonate, a methanesulfonate, and an ethanesulfonate. Typical specific examples of the tertiary amine salt include salts (e.g., a p-toluenesulfonate and an octylate) of 1,8-diazabicyclo[5.4.0]undecene-7 (DBU).

Examples of the borate include trimethyl borate, triethyl borate, tripropyl borate, tributyl borate, and a cyclic borate compound.

The Lewis acid only needs to be a compound having an electron pair-accepting property (including a transition metal-based compound), but is preferably a compound containing any of the following elements in consideration of its characteristics: titanium, zinc, tin, scandium, ytterbium, vanadium, chromium, manganese, cobalt, nickel, iron, and copper, as well as boron, aluminum, gallium, indium, and thallium.

Examples of the organometallic compound include zinc octylate, tin octylate, zinc naphthenate, cobalt naphthenate, tin stearate, zinc stearate, and an aluminum acetylacetonate complex.

Examples of the organic phosphorus-based compound include tetraphenylphosphonium-tetraphenylborate and triphenylphosphine.

Examples of the quaternary ammonium salt include tetramethylammonium chloride, tetramethylammonium bromide, tetramethylammonium iodide, tetraethylammonium chloride, tetraethylammonium bromide, tetraethylammonium iodide, tetrabutylammonium chloride, tetrabutylammonium bromide, tetrabutylammonium iodide, triethylbenzylammonium chloride, triethylbenzylammonium bromide, triethylbenzylammonium iodide, triethylphenethylammonium chloride, triethylphenethylammonium bromide, and triethylphenethylammonium bromide.

Examples of the quaternary phosphonium salt include tetrabutylphosphonium chloride, tetrabutylphosphonium iodide, tetrabutylphosphonium acetate, tetraphenylphosphonium chloride, tetraphenylphosphonium bromide, tetraphenylphosphonium iodide, ethyltriphenylphosphonium chloride, ethyltriphenylphosphonium bromide, ethyltriphenylphosphonium iodide, ethyltriphenylphosphonium acetate, ethyltriphenylphosphonium phosphate, propyltriphenylphosphonium chloride, propyltriphenylphosphonium bromide, propyltriphenylphosphonium iodide, butyltriphenylphosphonium chloride, butyltriphenylphosphonium bromide, and butyltriphenylphosphonium iodide.

An example of the amine complex is a boron halide-amine complex, which is a complex of a boron halide, such as boron trifluoride, boron trichloride, or boron tribromide, and an amine compound. Herein, examples of the amine compound include: aliphatic tertiary amines, such as trimethylamine, tri-n-propylamine, N,N-dimethyloctylamine, and N,N-dimethylbenzylamine; aromatic tertiary amines, such as N,N-dimethylaniline; heterocyclic tertiary amines, such as substituted or unsubstituted imidazole or pyridine alkylated at the 1-position; aliphatic primary amines, such as monoethylamine and n-hexylamine; aliphatic primary amines each containing an aromatic ring, such as benzylamine; aromatic primary amines, such as aniline; and secondary amines, such as piperidine.

Typical specific examples of the boron halide-amine complex include a boron trifluoride-monoethylamine complex, a boron trifluoride-diethylamine complex, a boron trifluoride-isopropylamine complex, a boron trifluoride-chlorophenylamine complex, a boron trifluoride-triallylamine complex, a boron trifluoride-benzylamine complex, a boron trifluoride-aniline complex, a boron trichloride-monoethylamine complex, a boron trichloride-phenol complex, a boron trichloride-piperidine complex, a boron trichloride-dimethyl sulfide complex, a boron trichloride-N,N-dimethyloctylamine complex, a boron trichloride-N,N-dimethyldodecylamine complex, and a boron trichloride-N,N-diethyldioctylamine complex.

Examples of the imidazole-based compound include 2-methylimidazole, 2-phenylimidazole, 2-undecylimidazole, 2-heptadecylimidazole, 2-phenyl-4-methylimidazole, 1-benzyl-2-phenylimidazole, 1-benzyl-2-methylimidazole, 1-cyanoethyl-2-methylimidazole, 1-cyanoethyl-2-phenylimidazole, 1-cyanoethyl-2-undecylimidazole, 1-(2-cyanoethyl)-2-ethyl-4-methylimidazole, 2,4-diamino-6(2'-methylimidazole(1'))ethyl-s-triazine, 2,4-diamino-6(2'-undecylimidazole(1'))ethyl-s-triazine, 2,4-diamino-6(2'-ethyl,4-methylimidazole(1'))ethyl-s-triazine, an isocyanuric acid adduct of 2,4-diamino-6(2'-methylimidazole(1'))ethyl-s-triazine, a 2:3 adduct of 2-methylimidazole with isocyanuric acid, an isocyanuric acid adduct of 2-phenylimidazole, 2-phenyl-3,5-dihydroxymethylimidazole, 2-phenyl-4-hydroxymethyl-5-methylimidazole, and 1-cyanoethyl-2-phenyl-3,5-dicyanoethoxymethylimidazole.

The blending amount of the curing catalyst for an epoxy resin in the solvent-free varnish composition in this embodiment, which is not particularly limited, is preferably 0.01 part by mass or more and 10.0 parts by mass or less, more preferably 0.02 part by mass or more and 5.0 parts by mass or less with respect to 100 parts by mass of the total of the thermosetting resin (A) and the thermosetting resin (B), and the (optional polyfunctional vinyl-based monomer). When the blending amount of the curing catalyst for an epoxy resin is less than 0.01 part by mass, an effect of causing the ring-opening polymerization of an epoxy group may not be sufficiently obtained. Further, when the blending amount of the curing catalyst for an epoxy resin is more than 10.0 parts by mass, the pot life may be excessively short.

A vinyl-based monomer excellent in compatibility with an alternative refrigerating machine oil, such as a polyalkylene glycol oil, an ester oil, or an ether oil, is used for adjusting the viscosity of the solvent-free varnish composition of this embodiment. The vinyl-based monomer is preferably a low-viscosity vinyl-based monomer having an ether bond or an ester bond, and a monofunctional vinyl monomer is more preferably used for securing the pot life of the solvent-free varnish composition.

The vinyl-based monomer to be preferably used in the solvent-free varnish composition of this embodiment is a hydroxyalkyl monomer, alkyl monomer, alicyclic monomer, aromatic monomer, or ether monomer having a vinyl group, an allyl group, a methacryloyl group, or an acryloyl group.

In particular, in the solvent-free varnish composition of this embodiment, in order that its viscosity may be adjusted, a low-viscosity methacrylic monomer or acrylic monomer having a viscosity at room temperature (25° C.) of 20 mPa·s or less is preferred. For example, a compound represented by the general formula (VI) or a compound represented by the general formula (VII) may be used. In particular, a monofunctional vinyl-based monomer having one methacryloyl group or acryloyl group is more preferred from the viewpoint that both high reactivity at the time of the curing and the pot life are achieved. The vinyl-based monomers may be used alone or as a mixture thereof.

The compound represented by the general formula (VI) is as described below.

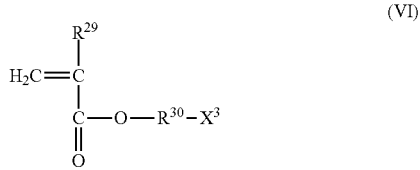

(VI)

In the general formula (VI), $R^{29}$ represents a hydrogen atom or an alkyl group having 1 to 5 carbon atoms, $R^{30}$ represents $-(CH_2)_s-$, where s represents an integer of from 1 to 10, or $-(CH(R^{31})O)_t-$, where $R^{31}$ represents a hydrogen atom or an alkyl group having 1 to 5 carbon atoms, and t represents an integer of from 1 to 10, and $X^3$ represents H, OH, or $OCO(R^{32})$, where $R^{32}$ represents an alkyl group having 1 to 5 carbon atoms, an allyl group, a vinyl group, or a 1-alkylvinyl group having an alkyl group having 1 to 5 carbon atoms, and particularly in the case of the monofunctional vinyl-based monomer, $R^{32}$ represents an alkyl group having 1 to 5 carbon atoms.

The compound represented by the general formula (VII) is as described below.

$CH_2=CH-CH_2-OR^{33}$ (VII)

In the general formula (VII), $R^{33}$ represents a hydrogen atom, or a monovalent group having 1 to 20 carbon atoms and 0 to 10 oxygen atoms, the monovalent group containing at least one group selected from the group consisting of an aromatic hydrocarbon group, and a linear or branched, saturated or unsaturated aliphatic hydrocarbon group.

Specific examples of the compound represented by the general formula (VI) include 2-hydroxyethyl (meth)acrylate, 2-hydroxypropyl (meth)acrylate, lauryl (meth)acrylate, ethoxy diethylene glycol (meth)acrylate, 4-hydroxybutyl (meth)acrylate, and n-octyl acrylate.

The compound represented by the general formula (VII) is specifically, for example, diethylene glycol bisallyl carbonate.

Of the above-mentioned monofunctional vinyl-based monomers, 2-hydroxyethyl (meth)acrylate and 2-hydroxypropyl (meth)acrylate are preferred because the monomers are each particularly excellent in compatibility with the alternative refrigerating machine oil.

Although the blending amount of the monofunctional vinyl-based monomer in the solvent-free varnish composition of this embodiment is not particularly limited, a mass ratio between the total of the thermosetting resin (A) and the thermosetting resin (B), and the monofunctional vinyl-based monomer (the total of the thermosetting resin (A) and the thermosetting resin (B)/the monofunctional vinyl-based monomer) is preferably 15/85 or more, more preferably 30/70 or more in consideration of the solvent resistance of the cured product (the extraction amount of the extract produced from the cured product when the cured product is exposed to a refrigerant-based environment). In addition, the mass ratio is preferably 90/10 or less, more preferably 70/30 or less in consideration of the property by which the composition is impregnated into the coil.

The polyfunctional vinyl-based monomer having two or more (meth)acryloyl groups or allyl groups in a molecule thereof is optionally blended as an additional reactive diluent for further reducing the extraction amount of the extract produced from the cured product when the cured product is exposed to a refrigerant-based environment.

The polyfunctional vinyl-based monomer has two or more (meth)acryloyl groups or allyl groups as reaction active groups in a molecule thereof. Accordingly, the monomer polymerizes during the curing treatment of the solvent-free varnish composition to be completely taken in the composition, and the extent of its volatilization during the curing treatment is significantly small. In addition, the monomer has a plurality of reaction active groups, and hence can be actively involved in the polymerization reaction of the solvent-free varnish composition to accelerate the three-dimensional crosslinking of the solvent-free varnish composition. Accordingly, the heat resistance and mechanical strength of the cured product can be improved.

The polyfunctional vinyl-based monomer is not particularly limited as long as the monomer has two or more (meth)acryloyl groups or allyl groups in a molecule thereof, and a polyfunctional vinyl-based monomer known in the art may be used. In addition, the polyfunctional vinyl-based monomer is used as a reactive diluent, and hence a polyfunctional vinyl-based monomer having a viscosity (25° C.) of 50 mPa·s or less is preferred for reducing the viscosity of the solvent-free varnish composition.

Examples of the polyfunctional vinyl-based monomer include esters or ethers obtained by subjecting a carboxylic acid, such as trimellitic acid or pyromellitic acid, and an alcohol, such as trimethylolpropane, trihydroxyethyl isocyanurate, or pentaerythritol, to a reaction with a vinyl group-containing monomer, such as acrylic acid, methacrylic acid, or allyl alcohol.

Preferred specific examples of the polyfunctional vinyl-based monomer include 2-hydroxy-3-acryloyloxypropyl methacrylate, polyethylene glycol diacrylate, ethoxylated bisphenol A diacrylate, propoxylated ethoxylated bisphenol A diacrylate, tricyclodecane dimethanol diacrylate, 9,9-bis [4-(2-acryloyloxyethoxy)phenyl]fluorene, 1,10-decanediol diacrylate, 1,9-nonanediol diacrylate, dipropylene glycol diacrylate, tripropylene glycol diacrylate, polypropylene glycol diacrylate, polytetramethylene glycol diacrylate, 1,6-hexanediol diacrylate, neopentyl glycol diacrylate, PO-modified neopentyl glycol diacrylate, neopentyl glycol-hydroxypivalate diacrylate, ethoxylated isocyanurate triacrylate, ε-caprolactone-modified tris-(2-acryloxyethyl) isocyanurate, ethoxylated glycerin triacrylate, pentaerythritol triacrylate, trimethylolpropane triacrylate, ditrimethylolpropane tetraacrylate, ethoxylated pentaerythritol tetraacrylate, pentaerythritol tetraacrylate, dipentaerythritol polyacrylate, dipentaerythritol hexaacrylate, glycerin propoxy triacrylate, trimethylolpropane ethoxy triacrylate, pentaerythritol ethoxy tetraacrylate, ethylene glycol dimethacrylate, diethylene glycol dimethacrylate, triethylene glycol dimethacrylate, polyethylene glycol dimethacrylate, ethoxylated bisphenol A dimethacrylate, tricyclodecane dimethanol dimethacrylate, 1,10-decanediol dimethacrylate, 1,6-hexanediol dimethacrylate, 1,9-nonanediol dimethacrylate, neopentyl glycol dimethacrylate, ethoxylated polypropylene glycol dimethacrylate, glycerin dimethacrylate, polypropylene glycol dimethacrylate, and trimethylolpropane trimethacrylate. The polyfunctional vinyl-based monomers may be used alone or as a mixture thereof.

When the polyfunctional vinyl-based monomer is used, from the viewpoint of sufficiently obtaining the above-mentioned effect, the blending amount of the polyfunctional vinyl-based monomer is as follows: the ratio of the polyfunctional vinyl-based monomer with respect to the total amount of the monofunctional vinyl-based monomer and the polyfunctional vinyl-based monomer is preferably 5 mass % or more, more preferably 30 mass % or more. In addition, from the viewpoint of preventing cracks from occurring in the cured product in association with the curing shrinkage of the cured product due to an excessive increase in crosslink density thereof, the ratio of the polyfunctional vinyl-based monomer is preferably 60 mass % or less, more preferably 50 mass % or less.

An organic acid metal salt may be blended into the solvent-free varnish composition of this embodiment as required from the viewpoint of improving the solvent resistance of the cured product to an incompatible refrigerating machine oil, such as a conventional naphthene- or paraffin-based mineral oil or alkylbenzene-based oil (the extraction amount of the extract produced from the cured product is reduced). The organic acid metal salt significantly improves the surface hardness of the cured product of the solvent-free varnish composition, and hence can reduce the extraction amount of the extract.

The organic acid metal salt is not particularly limited, and an organic acid metal salt known in the art may be used. An example of the organic acid metal salt is a salt of an organic acid, such as octylic acid or naphthenic acid, and a metal, such as Co, Mn, Sn, Ni, Zn, Pb, Cr, or Fe. Specific examples of the organic acid metal salt include cobalt naphthenate, manganese naphthenate, tin naphthenate, nickel naphthenate, zinc naphthenate, lead naphthenate, chromium naphthenate, iron naphthenate, cobalt octylate, manganese octylate, tin octylate, nickel octylate, zinc octylate, lead octylate, chromium octylate, and iron octylate. Those organic acid metal salts may be used alone or as a mixture thereof.

The blending amount of the organic acid metal salt in the solvent-free varnish composition of this embodiment, which is not particularly limited, is preferably 0.01 part by mass or more, more preferably 0.03 part by mass or more with respect to 100 parts by mass of the solvent-free varnish composition from the viewpoint of sufficiently obtaining the above-mentioned effect. In addition, the amount is preferably 10 parts by mass or less, more preferably 5 parts by mass or less with respect to 100 parts by mass of the solvent-free varnish composition from the viewpoint of preventing the pot life of the solvent-free varnish composition from shortening.

A photoinitiator may be blended as a reaction initiator into the solvent-free varnish composition of this embodiment as required for enabling its curing with UV light. The blending of the photoinitiator can suppress the volatilization of various monomers and the like occurring at the time of the curing of the solvent-free varnish composition, and hence can significantly reduce the deterioration of a working environment and the influence on air pollution.

The photoinitiator is not particularly limited, and a photoinitiator known in the art may be used. Examples of the photoinitiator include: benzoin ether-based compounds, such as benzoin isobutyl ether and hydroxycyclohexyl phenyl ketone; benzyl ketal-based compounds, such as dimethyl benzyl ketal; acetophenone derivatives, such as 1-phenyl-2-hydroxy-2-methylpropan-1-one; and ketone-based compounds, such as 4,4-bis(dimethylaminobenzophenone). Those photoinitiators may be used alone or as a mixture thereof.

The blending amount of the photoinitiator in the solvent-free varnish composition of this embodiment is preferably 0.1 part by mass or more, more preferably 0.5 part by mass or more with respect to 100 parts by mass of the solvent-free varnish composition from the viewpoint of sufficiently obtaining the above-mentioned effect. In addition, the blending amount of the photoinitiator is preferably 20 parts by mass or less, more preferably 10 parts by mass or less with respect to 100 parts by mass of the solvent-free varnish composition from the viewpoint of reducing the following risk: the photoinitiator is extracted from the cured product of the solvent-free varnish composition into a refrigerant to be responsible for the contamination of a refrigerant system.

A method of producing the solvent-free varnish composition of this embodiment is not particularly limited, and the above-mentioned components only need to be uniformly mixed. A method for the mixing is not particularly limited, and the mixing only needs to be performed with a mixer known in the art.

The solvent-free varnish composition of this embodiment can be used as an insulating varnish because the composition shows a small energy loss and requires a short curing time in its curing treatment step, and provides a cured product that barely causes the precipitation of an oligomer or the like even when exposed to a refrigerant-based environment containing a refrigerant and a refrigerating machine oil under high temperature and high pressure.

The coil to be impregnated with the solvent-free varnish composition of this embodiment is not particularly limited, and examples thereof include coils to be used in various rotating machines, such as motors, generators, transformers, and electric compressors. In addition, the structure of the coil is not particularly limited, but the coil has, for example, a core having a plurality of slots and a winding wire arranged in the slots. In addition, an insulating tape may be bonded to the coil, or interlayer paper may be inserted into the coil. The impregnation of the coil with the solvent-free varnish composition of this embodiment is performed mainly for the purposes of: electrically insulating the winding wire of the coil; physically supporting and sticking the winding wire; suppressing the heat generation of the winding wire through the transfer of heat generated in the winding wire to the core; and protecting the winding wire.

The impregnation of the coil with the solvent-free varnish composition of this embodiment, which is not particularly limited, generally includes the following five steps: a preheating step, an air-cooling step, an impregnating step, a dripping step, and a curing-drying step. In the preheating step, the coil before the impregnation serving as a body to be treated is thermally treated at a predetermined temperature. In the air-cooling step, the coil obtained in the preheating step is cooled to a predetermined temperature in order that an increase in temperature of the solvent-free varnish composition in the impregnating step may be suppressed. In the impregnating step, the coil obtained in the air-cooling step is dipped in the solvent-free varnish composition in an impregnation tank to be impregnated therewith. In the dripping step, any unnecessary solvent-free varnish composition adhering to, for example, the side surface of the coil treated in the impregnating step is dripped off. In the curing-drying step, the solvent-free varnish composition with which the coil has been impregnated is cured.

A method of impregnating the coil with the solvent-free varnish composition is not limited to the dipping method involving dipping the coil in the impregnation tank containing the solvent-free varnish composition given in the foregoing, and any other known method, such as a dripping method involving dripping the solvent-free varnish composition on the coil, may be used.

In cases where the dipping method is used, the coil is preferably dipped, for example, at a temperature of the solvent-free varnish composition of from about 15° C. to about 70° C. for a time period of from 1 minute to 20 minutes, though preferred conditions vary depending on, for example, the shape of the coil and the kind of solvent-free varnish composition. In this case, ultrasonic vibration may be applied to cause the solvent-free varnish composition to permeate fine voids of the coil. At this time, when the temperature is less than 15° C., there is a risk of the viscosity of the solvent-free varnish composition increasing and hence the impregnation of the solvent-free varnish composition into the coil becomes insufficient. Further, when the temperature is more than 70° C., the pot life of the solvent-free varnish composition may shorten. In addition, when the impregnation time is less than 1 minute, the impregnation of the solvent-free varnish composition into the coil may be insufficient. Also, even when the impregnation is performed for more than 20 minutes, a significant increase in the amount of solvent-free varnish composition adhering to the coil cannot be expected, but instead, working time increases. Accordingly, such impregnation time is not preferred in terms of productivity.

In cases where the dripping method is used, the impregnation is preferably performed, for example, at a temperature of the solvent-free varnish composition of from about 90° C. to about 110° C. for a time period of from 1 minute to 20 minutes while ultrasonic vibration is applied, though preferred conditions vary depending on, for example, the shape of the coil and the kind of solvent-free varnish composition. At this time, when the temperature is less than 90° C., there is a risk in that the viscosity of the solvent-free varnish composition is high and hence the solvent-free varnish composition cannot be rapidly impregnated into the coil. Further, when the temperature is more than 110° C., the viscosity may increase owing to the advance of the curing of the solvent-free varnish composition. In addition, when the impregnation time is less than 1 minute, the impregnation of the solvent-free varnish composition into the coil may be insufficient. Also, even when the impregnation is performed for more than 20 minutes, a significant increase in the amount of composition adhering to the coil cannot be expected, but instead, working time increases. Accordingly, such impregnation time is not preferred in terms of productivity.

In both cases of the dipping method and the dripping method, the impregnation may be performed in a plurality of stages.

The heating temperature in the curing-drying step, which is not particularly limited, is generally from 130° C. to 180° C., preferably from 140° C. to 170° C. With regard to heating time, the curing rate of the solvent-free varnish composition and the adhesion amount thereof to the coil vary depending on the composition of the solvent-free varnish composition. Therefore, the heating time required for the solvent-free varnish composition to completely cure only needs to be set in accordance with the composition of the solvent-free varnish composition, and the heating time is generally from 10 minutes to 6 hours, preferably from 20 minutes to 4 hours, more preferably from 30 minutes to 2 hours. The adoption of such curing conditions can provide a coil excellent in electrical insulating property. In particular, when a cyclic coil arranged in a stator core is impregnated with the solvent-free varnish composition, and the composition is heated at from 130° C. to 180° C. for from 10 minutes to 6 hours to be cured, short circuits due to contact with a conductor can be avoided and the strength of the coil can be improved.

When the heating temperature is excessively low or the heating time is excessively short, an uncured portion occurs in the solvent-free varnish composition in the curing-drying step reducing various characteristics, such as electrical and mechanical characteristics, in some cases. Also, when the heating temperature is excessively high or the heating time is excessively long, the balance of a crosslinking reaction is lost in the curing-drying step, becoming responsible for the occurrence of cracks in the cured product in some cases.

An insulated coil obtained by the impregnation treatment with the solvent-free varnish composition based on such method as described above can be incorporated into motors, generators, transformers, electric compressors, or the like.

In particular, when the insulated coil obtained by such method as described above is applied as a coil for a closed electric compressor to be used in a refrigerating/air-conditioning apparatus, the coil is exposed to high temperature and high pressure in a refrigerant system containing a refrigerant (a hydrofluorocarbon, such as R-134a, R-125, R-32, R-23, R-152a, R-407C, R-404A, or R-410A, or a natural refrigerant, such as $CO_2$, propane, propylene, isobutane, or ammonia) and a refrigerating machine oil (an incompatible oil or a compatible oil). The cured product of the solvent-free varnish composition of this embodiment barely causes the precipitation of a low-molecular weight organic compound (e.g., an oligomer) even when exposed to such environment, and hence the cured product does not induce problems, such as the locking of a circulation path in the compressor and the clogging of a capillary tube. Accordingly, a rotating machine and a closed electric compressor each having high reliability can be provided.

Embodiment 2

A closed electric compressor of this embodiment is used in a refrigerating/air-conditioning apparatus using a refrigerant containing a hydrofluorocarbon as a main component or a refrigerant containing a natural refrigerant as a main component, and the closed electric compressor includes: a closed vessel; a motor element and a compression element driven by the motor element, the elements being housed in the closed vessel; and a refrigerating machine oil stored in the bottom portion of the closed vessel. The motor element includes a stator including the insulated coil described in Embodiment 1.

The closed electric compressor of this embodiment is described below with reference to the drawings.

Figure 1B:
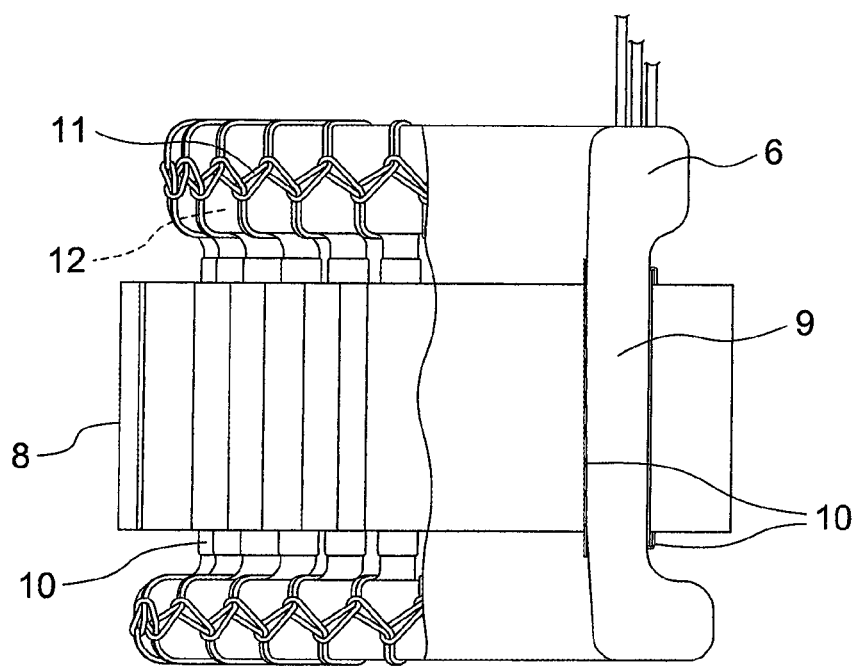

FIG. 1A and FIG. 1B show partial schematic explanatory views of the closed electric compressor, in which FIG. 1A is a plan view and FIG. 1B is a side view. In addition, FIG. 2 is a schematic explanatory view of the closed electric compressor.

Figure 2:
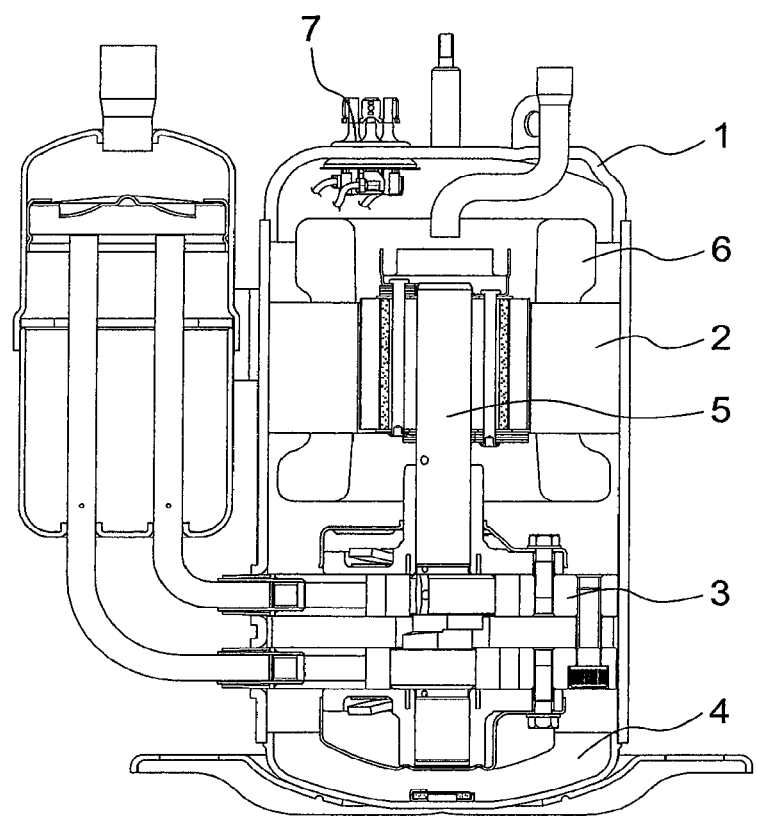
FIG. 2 is a schematic explanatory view of the closed electric compressor.

In each of FIG. 1A, FIG. 1B and FIG. 2, the closed electric compressor includes the closed vessel 1, and the motor element 2 and the compression element 3 arranged in the closed vessel 1. The compression element 3 is driven by the motor element 2, and the refrigerating machine oil 4 is stored in the bottom portion of the closed vessel 1. The motor element 2 has a stator whose outer peripheral portion is fixed to the closed vessel 1, and a rotor that is supported so as to keep a certain gap from the inner peripheral surface of the stator and that is coupled to the compression element 3 by the crankshaft 5. In addition, the magnet wire 6 arranged in the stator is coupled to the compression power terminal 7, which is arranged on the closed vessel 1, so that electric power may be supplied thereto.

As illustrated in FIG. 1A and FIG. 1B, the stator includes: the core 8 obtained by laminating iron plates in a cylindrical manner; the magnet wire 6 passing the insides of the slots 9 formed in a large number in an axial direction in the inner peripheral surface of the core 8; the insulating films 10 between the core 8 and the magnet wire 6, and between layers in the magnet wire 6; and the binding thread 11 to be used for the binding of the magnet wire 6. In addition, the magnet wire 6 is subjected to an impregnation treatment with the insulating varnish 12 in order that its insulating performance may be improved. In the closed electric compressor of this embodiment, the solvent-free varnish composition of Embodiment 1 is used as the insulating varnish 12.

As described above, the solvent-free varnish composition of Embodiment 1 provides a cured product that barely causes the precipitation of an oligomer or the like even when exposed to a refrigerant-based environment containing a refrigerant and a refrigerating machine oil under high temperature and high pressure. Accordingly, the use of the solvent-free varnish composition of Embodiment 1 as the insulating varnish 12 can provide a closed electric compressor having high reliability, the closed electric compressor barely causing insulation deterioration and being capable of suppressing the clogging of a restricting portion, such as a capillary tube or an expansion valve.

EXAMPLES

The present invention is described in detail below by way of Examples and Comparative Examples. However, the present invention is not limited thereto.

In the following Examples and Comparative Examples, the following materials were used.

<Thermosetting Resin (A)>

Thermosetting resin (A-1): Such a bisphenol A-type epoxy methacrylate (having two methacryloyl groups in a molecule thereof) that in the general formula (I), $R^1$, $R^2$, and $R^3$ each represent $CH_3$, $R^4$ represents H, $R^5$ represents a group represented by the general formula (i), where $R^6$ represents $CH_3$, and l represents from 5 to 8, the bisphenol A-type epoxy methacrylate having a weight-average molecular weight of about 2,000 and a viscosity at 60° C. of 3,500 mPa·s Thermosetting resin (A-2): Such a bisphenol F-type epoxy acrylate (having two acryloyl groups in a molecule thereof) that in the general formula (I), $R^1$, $R^2$, and $R^3$ each represent H, $R^4$ represents H, $R^5$ represents a group represented by the general formula (i), where $R^6$ represents H, and l represents from 5 to 8, the bisphenol F-type epoxy acrylate having a weight-average molecular weight of about 2,000 and a viscosity at 60° C. of 3,300 mPa·s Thermosetting resin (A-3): Such a bisphenol A-type epoxy methacrylate (having two methacryloyl groups in a molecule thereof) that in the general formula (I), $R^1$ represents $CH_3$, $R^2$ and $R^3$ each represent H, $R^4$ represents H, $R^5$ represents a group represented by the general formula (i), where $R^6$ represents $CH_3$, and l represents from 10 to 15, the bisphenol A-type epoxy methacrylate having a weight-average molecular weight of about 4,000 and a viscosity at 60° C. of 4,800 mPa·s Thermosetting resin (A-4): Such a bisphenol A-type brominated epoxy methacrylate (having two methacryloyl groups in a molecule thereof) that in the general formula (I), $R^1$, $R^2$, and $R^3$ each represent $CH_3$, $R^4$ represents Br, $R^5$ represents a group represented by the general formula (i), where $R^6$ represents $CH_3$, and l represents from 6 to 9, the bisphenol A-type brominated epoxy methacrylate having a weight-average molecular weight of about 4,250 and a viscosity at 60° C. of 5,500 mPa·s Thermosetting resin (A-5): Such a resin (having a large number of acryloyl groups in a molecule thereof) that in the general formula (III), $R^{13}$, $R^{14}$, and $R^{15}$ each represent H, $R^{16}$, $R^{17}$, and $R^{18}$ each represent a group represented by the general formula (i), where $R^6$ represents H, and n represents from 16 to 22, the resin having a weight-average molecular weight of about 5,500 and a viscosity at 60° C. of 5,300 mPa·s Thermosetting resin (A-6): Such a bisphenol F-type epoxy acrylate (having two acryloyl groups in a molecule thereof) that in the general formula (I), $R^1$ represents H, $R^2$ and $R^3$ each represent $CH_3$, $R^4$ represents H, $R^5$ represents a group represented by the general formula (i), where $R^6$ represents H, and l represents from 16 to 20, the bisphenol F-type epoxy acrylate having a weight-average molecular weight of about 3,000 and a viscosity at 60° C. of 4,000 mPa·s Thermosetting resin (A-7): Such a bisphenol A-type epoxy methacrylate (having two methacryloyl groups in a molecule thereof) that in the general formula (I), $R^1$, $R^2$, and $R^3$ each represent $CH_3$, $R^4$ represents H, $R^5$ represents a group represented by the general formula (i), where $R^6$ represents $CH_3$, and l represents from 51 to 58, the bisphenol A-type epoxy methacrylate having a weight-average molecular weight of about 17,000 and a viscosity at 60° C. of 7,300 mPa·s Thermosetting resin (A-8): Such a bisphenol A-type brominated epoxy methacrylate (having two methacryloyl groups in a molecule thereof) that in the general formula (I), R', $R^2$, and $R^3$ each represent $CH_3$, $R^4$ represents Br, $R^5$ represents a group represented by the general formula (i), where $R^6$ represents $CH_3$, and l represents 1, the bisphenol A-type brominated epoxy methacrylate having a weight-average molecular weight of about 870 and a viscosity at 60° C. of 300 mPa·s Thermosetting resin (A-9): Such a bisphenol A-type epoxy methacrylate (having two methacryloyl groups in a molecule thereof) that in the general formula (II), R', $R^8$, and $R^9$ each represent $CH_3$, $R^{10}$ represents H, $R^{11}$ represents a group represented by the general formula (ii), where $R^{12}$ represents $CH_3$, $X^1$ and $X^2$ each represent —$(CH_2)$—O—C(=O)—$(CH_2)_4$—C(=O)—O—, and m represents from 7 to 11, the bisphenol A-type epoxy methacrylate having a weight-average molecular weight of about 2,500 and a viscosity at 60° C. of 3,000 mPa·s <Thermosetting Resin (B)>

Thermosetting resin (B-1): Such a thermosetting resin (having one epoxy group in a molecule thereof) that in the general formula (IV), $R^{19}$ and $R^{20}$ each represent $CH_3$, $R^{21}$ represents H, $R^{22}$ represents a group represented by the general formula (i), where $R^6$ represents $CH_3$, and p represents from 3 to 7, the thermosetting resin having a weight-average molecular weight of about 1,850 and a viscosity at 60° C. of 3,800 mPa·s Thermosetting resin (B-2): Such a thermosetting resin (having one epoxy group in a molecule thereof) that in the general formula (IV), $R^{19}$, $R^{20}$, and $R^{21}$ each represent H, $R^{22}$ represents a group represented by the general formula (i), where $R^6$ represents H, and p represents from 7 to 13, the thermosetting resin having a weight-average molecular weight of about 3,550 and a viscosity at 60° C. of 6,000 mPa·s Thermosetting resin (B-3): Such a thermosetting resin (having two epoxy groups in a molecule thereof) that in the general formula (IV), $R^{19}$, $R^{20}$ and $R^{21}$ each represent H, $R^{22}$ represents an epoxy group represented by the formula (iii), and p represents from 7 to 13, the thermosetting resin having a weight-average molecular weight of about 3,530 and a viscosity at 60° C. of 5,900 mPa·s Thermosetting resin (B-4): Such a thermosetting resin (having one epoxy group in a molecule thereof) that in the general formula (IV), $R^{19}$ and $R^{20}$ each represent $CH_3$, $R^{21}$ represents H, $R^{22}$ represents a group represented by the general formula (i), where $R^6$ represents H, and p represents from 9 to 15, the thermosetting resin having a weight-average molecular weight of about 4,200 and a viscosity at 60° C. of 6,500 mPa·s Thermosetting resin (B-5): Such a thermosetting resin (having one epoxy group in a molecule thereof) that in the general formula (IV), $R^{19}$ and $R^{20}$ each represent $CH_3$, $R^{21}$ represents Br, $R^{22}$ represents a group represented by the general formula (i), where $R^6$ represents $CH_3$, and p represents from 2 to 5, the thermosetting resin having a weight-average molecular weight of about 2,700 and a viscosity at 60° C. of 4,700 mPa·s Thermosetting resin (B-6): Such a thermosetting resin (having a plurality of epoxy groups in a molecule thereof) that in the general formula (V), $R^{23}$, $R^{24}$, and $R^{25}$ each represent H, 25% of $R^{26}$, $R^{27}$, and $R^{28}$ each represent an epoxy group represented by the formula (iii), and 75% thereof each represent a group represented by the general formula (i), where $R^6$ represents H, and q represents from 5 to 9, the thermosetting resin having a weight-average molecular weight of about 2,000 and a viscosity at 60° C. of 3,900 mPa·s Thermosetting resin (B-7): Such a thermosetting resin (having one epoxy group in a molecule thereof) that in the general formula (IV), $R^{19}$ and $R^{20}$ each represent $CH_3$, $R^{21}$ represents H, $R^{22}$ represents a group represented by the general formula (i), where $R^6$ represents $CH_3$, and p represents 0 or 1, the thermosetting resin having a weight-average molecular weight of about 870 and a viscosity at 60° C. of 390 mPa·s Thermosetting resin (B-8): Such a thermosetting resin (having one epoxy group in a molecule thereof) that in the general formula (IV), $R^{19}$ and $R^{20}$ each represent $CH_3$, $R^{21}$ represents H, $R^{22}$ represents a group represented by the general formula (ii), where $R^{12}$ represents $CH_3$ and $X^2$ represents —$(CH_2)$—O—C(=O)—$(CH_2)_4$—C(=O)—O—, and p represents from 4 to 8, the thermosetting resin having a weight-average molecular weight of about 2,400 and a viscosity at 60° C. of 2,700 mPa·s <Monofunctional Vinyl-Based Monomer>

Monofunctional vinyl-based monomer (C-1): 2-hydroxyethyl methacrylate (viscosity at 25° C.: 6 mPa·s)

Monofunctional vinyl-based monomer (C-2): 2-hydroxypropyl acrylate (viscosity at 25° C.: 4 mPa·s)

Monofunctional vinyl-based monomer (C-3): methoxydiethylene glycol methacrylate (viscosity at 25° C.: 3 mPa·s)

Monofunctional vinyl-based monomer (C-4): dicyclopentenyloxyethyl methacrylate (viscosity at 25° C.: 20 mPa·s)

Monofunctional vinyl-based monomer (C-5): 2-hydroxypropyl methacrylate (viscosity at 25° C.: 10 mPa·s)

<Organic Peroxide>

Organic peroxide (D-1): dicumyl peroxide (10-hour half-life temperature: 116.4° C.)

Organic peroxide (D-2): t-butyl peroxybenzoate (10-hour half-life temperature: 104.3° C.)

Organic peroxide (D-3): t-butyl cumyl peroxide (10-hour half-life temperature: 119.5° C.)

Organic peroxide (D-4): 2,5-dimethyl-2,5-di(t-butylperoxy)hexane (10-hour half-life temperature: 117.9° C.)

Organic peroxide (D-5): cumyl peroxyneodecanoate (10-hour half-life temperature: 36.5° C.)

<Curing Catalyst for Epoxy Resin>

Curing catalyst (E-1) for epoxy resin: triphenylphosphine

Curing catalyst (E-2) for epoxy resin: zinc octylate

Curing catalyst (E-3) for epoxy resin: 1-cyanoethyl-2-methylimidazole

Curing catalyst (E-4) for epoxy resin: boron trichloride-N,N-diethyldioctylamine complex Curing catalyst (E-5) for epoxy resin: octylate of 1,8-diazabicyclo[5.4.0]undecene-7 (DBU)

<Polyfunctional Vinyl-Based Monomer>

Polyfunctional vinyl-based monomer (F-1): trimethylolpropane triacrylate (viscosity at 25° C.: 110 mPa·s)

Polyfunctional vinyl-based monomer (F-2): pentaerythritol tetraacrylate (viscosity at 25° C.: 250 mPa·s)

Polyfunctional vinyl-based monomer (F-3): neopentyl glycol diacrylate (viscosity at 25° C.: 6 mPa·s)

Polyfunctional vinyl-based monomer (F-4): neopentyl glycol dimethacrylate (viscosity at 25° C.: 5 mPa·s)

Example 1

60 Parts by mass of the thermosetting resin (A-1), 10 parts by mass of the thermosetting resin (B-1), 30 parts by mass of the monofunctional vinyl-based monomer (C-1), 5 parts by mass of the organic peroxide (D-1), and 0.4 part by mass of the curing catalyst (E-1) for an epoxy resin were uniformly mixed to provide a solvent-free varnish composition. The epoxy equivalent of a mixed resin of the thermosetting resin (A-1) and the thermosetting resin (B-1) was about 2,000.

Example 2

50 Parts by mass of the thermosetting resin (A-2), 10 parts by mass of the thermosetting resin (B-2), 10 parts by mass of the thermosetting resin (B-3), 20 parts by mass of the monofunctional vinyl-based monomer (C-2), 3 parts by mass of the organic peroxide (D-2), 0.6 part by mass of the curing catalyst (E-2) for an epoxy resin, and 10 parts by mass of the polyfunctional vinyl-based monomer (F-1) were uniformly mixed to provide a solvent-free varnish composition. The epoxy equivalent of a mixed resin of the thermosetting resin (A-2), the thermosetting resin (B-2), and the thermosetting resin (B-3) was about 1,200.

Example 3

50 Parts by mass of the thermosetting resin (A-3), 10 parts by mass of the thermosetting resin (B-4), 20 parts by mass of the monofunctional vinyl-based monomer (C-1), 2 parts by mass of the organic peroxide (D-3), 0.2 part by mass of the curing catalyst (E-3) for an epoxy resin, and 20 parts by mass of the polyfunctional vinyl-based monomer (F-2) were uniformly mixed to provide a solvent-free varnish composition. The epoxy equivalent of a mixed resin of the thermosetting resin (A-3) and the thermosetting resin (B-4) was about 4,000.

Example 4

40 Parts by mass of the thermosetting resin (A-4), 15 parts by mass of the thermosetting resin (B-5), 20 parts by mass of the vinyl-based monomer (C-1), 20 parts by mass of the monofunctional vinyl-based monomer (C-3), 2 parts by mass of the organic peroxide (D-4), 0.4 part by mass of the curing catalyst (E-4) for an epoxy resin, and 10 parts by mass of the polyfunctional vinyl-based monomer (F-3) were uniformly mixed to provide a solvent-free varnish composition. The epoxy equivalent of a mixed resin of the thermosetting resin (A-4) and the thermosetting resin (B-5) was about 3,800.

Example 5

30 Parts by mass of the thermosetting resin (A-5), 10 parts by mass of the thermosetting resin (B-6), 45 parts by mass of the monofunctional vinyl-based monomer (C-4), 3 parts by mass of the organic peroxide (D-4), 0.5 part by mass of the curing catalyst (E-5) for an epoxy resin, and 15 parts by mass of the polyfunctional vinyl-based monomer (F-4) were uniformly mixed to provide a solvent-free varnish composition. The epoxy equivalent of a mixed resin of the thermosetting resin (A-5) and the thermosetting resin (B-6) was about 1,500.

Example 6

55 Parts by mass of the thermosetting resin (A-9), 15 parts by mass of the thermosetting resin (B-8), 30 parts by mass of the monofunctional vinyl-based monomer (C-5), 5 parts by mass of the organic peroxide (D-1), and 0.4 part by mass of the curing catalyst (E-1) for an epoxy resin were uniformly mixed to provide a solvent-free varnish composition. The epoxy equivalent of a mixed resin of the thermosetting resin (A-9) and the thermosetting resin (B-8) was about 2,900.

Comparative Example 1

A solvent-free varnish composition was obtained in the same manner as in Example 1 except that: the thermosetting resin (B-1) and the curing catalyst (E-1) for an epoxy resin were not blended; and the blending amount of the thermosetting resin (A-1) was changed to 70 parts by mass.

Comparative Example 2

A solvent-free varnish composition was obtained in the same manner as in Example 1 except that: the thermosetting resin (B-1) was not blended; and the blending amount of the thermosetting resin (A-1) was changed to 70 parts by mass.

Comparative Example 3

A solvent-free varnish composition was obtained in the same manner as in Example 1 except that the curing catalyst (E-1) for an epoxy resin was not blended.

Comparative Example 4

A solvent-free varnish composition was obtained in the same manner as in Example 2 except that the organic peroxide (D-2) was changed to the organic peroxide (D-5).

Comparative Example 5

A solvent-free varnish composition was obtained in the same manner as in Example 3 except that the thermosetting resin (A-3) was changed to the thermosetting resin (A-7). The epoxy equivalent of a mixed resin of the thermosetting resin (A-7) and the thermosetting resin (B-4) was about 9,000.

Comparative Example 6

A solvent-free varnish composition was obtained in the same manner as in Example 4 except that: the thermosetting resin (A-4) was changed to the thermosetting resin (A-8); and the thermosetting resin (B-5) was changed to the thermosetting resin (B-7). The epoxy equivalent of a mixed resin of the thermosetting resin (A-8) and the thermosetting resin (B-7) was about 450.

Each of the solvent-free varnish compositions obtained in Examples and Comparative Examples described above was evaluated for its sticking force, extraction rate, and accelerated reliability with a closed electric compressor.

(1) Sticking Force

First, a helical coil serving as a test body was produced by using a magnet wire having a wire diameter of 1 mm (0EIW-AD manufactured by Sumitomo Electric Wintec, Inc.) in conformity with the standard of JIS C 2103. Next, a set of the 10 coils was vertically dipped in a solvent-free varnish composition, and was held for 60 seconds in a state of being dipped. After that, the coils were pulled up at a speed of 1 mm/sec. The solvent-free varnish composition was cured by thermally treating the coils to each of which the solvent-free varnish composition had adhered at a predetermined temperature under three conditions, i.e., 30 minutes, 1 hour, and 2 hours. Here, a heat treatment temperature was set to: 160° C. in each of Examples 1 and 6, and Comparative Examples 1 to 3; 155° C. in both Example 2 and Comparative Example 4; 165° C. in both Example 3 and Comparative Example 5; 170° C. in both Example 4 and Comparative Example 6; or 150° C. in Example 5. A three-point bending test was performed by using the coils thus obtained under the conditions of a span interval of 50 mm and a loading speed of 1 mm/sec, and a sticking force (N) was determined from a load at the time of the breakage of the coils. In this evaluation, the sticking force (N) is preferably 150 N or more.

(2) Extraction Rate

A solvent-free varnish composition was sealed between glass plates with a gap of 0.2 mm, and was thermally treated at a predetermined temperature under each of three conditions, i.e., 30 minutes, 1 hour, and 2 hours to be cured. After that, the cured product was removed from the glass plates to produce a sheet. Here, a heat treatment temperature in each of the Examples and Comparative Examples was set to be identical to that in the case of the evaluation for the sticking force. In order for the extraction characteristic of the produced sheet with respect to a refrigerant system containing a refrigerant and a refrigerating machine oil to be identified, a methanol extraction characteristic test was performed with methanol having extractability for the cured product higher than that of the refrigerant system. In the experiment, a Soxhlet extractor was used, and the sheet was warmed below the boiling point of methanol for 8 hours. After that, the weight of the flask of the extractor after the evaporation of methanol to dryness was measured, and the extractability of the sheet was calculated from a difference between the measured value and the weight of the flask of the extractor before the test in accordance with the following equation.

Extractability(%)=(weight of flask of extractor after evaporation of methanol to dryness−weight of flask of extractor before test)/weight of flask of extractor before test×100

Further, a solvent-free varnish composition was stored under the condition of 40° C. for 1 month, and then the same test as that described above was performed by using the solvent-free varnish composition.

(3) Accelerated Reliability

A closed electric compressor illustrated in FIG. 1A, FIG. 1B and FIG. 2 was produced. A solvent-free varnish composition was impregnated into the magnet wire 6, and was thermally treated under predetermined conditions to be cured. After that, the cured product was incorporated into the closed electric compressor. The heat treatment was performed under the conditions of: 160° C. and 30 minutes in each of Examples 1 and 6, and Comparative Examples 1 to 3; 155° C. and 1 hour in both Example 2 and Comparative Example 4; 165° C. and 1 hour in both Example 3 and Comparative Example 5; 170° C. and 30 minutes in both Example 4 and Comparative Example 6; or 150° C. and 1 hour in Example 5.

Next, in order for the presence or absence of a change in external appearance of the coil of the closed electric compressor and of the production of sludge therein in a refrigerant and a refrigerating machine oil to be confirmed, the closed electric compressor was incorporated into a simulated refrigeration cycle for an evaluation, and 4 kg of the refrigerant and 1.6 kg of the refrigerating machine oil were sealed therein. After that, an accelerated reliability test was performed for 2,000 hours. Here, in each of Example 1 and Comparative Examples 1 to 3, R-407C serving as a hydrofluorocarbon (manufactured by Daikin Industries, Ltd., a mixed refrigerant of three kinds of refrigerants, i.e., R-134a, R-125, and R-32) were used as the refrigerant, and a compatible-type ester oil (manufactured by Nippon Oil Co., Ltd., FREOL α) was used as the refrigerating machine oil. In both Example 2 and Comparative Example 4, R744 ($CO_2$) was used as the refrigerant, and a polyalkylene glycol was used as the refrigerating machine oil. In both Example 3 and Comparative Example 5, R-290 was used as the refrigerant, and a polyvinyl ether was used as the refrigerating machine oil. In both Example 4 and Comparative Example 6, R-1270 was used as the refrigerant, and the polyvinyl ether was used as the refrigerating machine oil. In Example 5, R717 (ammonia) was used as the refrigerant, and the polyalkylene glycol was used as the refrigerating machine oil. In Example 6, R-134a was used as the refrigerant, and the ester oil (manufactured by Nippon Oil Co., Ltd., FREOL α) was used as the refrigerating machine oil.

Next, the flow rate retention rate of a restricting portion of the closed electric compressor after the 2,000 hours of operation was calculated as follows: a refrigerant or air was flowed through the piping of the compressor at a constant pressure (0.49 $N/m^2$) and its outlet flow rate was measured with a flowmeter, and the ratio of the measured value to an outlet flow rate before the 2,000 hours of operation was calculated in accordance with the following equation.

Flow rate retention rate (%)=(outlet flow rate after 2,000 hours of operation/outlet flow rate before 2,000 hours of operation)×100

In this evaluation, a larger value for the flow rate retention rate means that a reduction in flow rate of the restricting portion is smaller.

In addition, a change in external appearance of each of an expansion valve and the piping line after the dismantling of the closed electric compressor was visually observed, and was evaluated on the basis of the following evaluation criteria.

(Evaluation Criteria for Change in External Appearance)
○: No change
Δ: Partial change
x: Remarkable change The results of the evaluation for (1) the sticking force are shown in Table 1, the results of the evaluation for (2) the extraction rate are shown in Table 2, and the results of the evaluation for (3) the accelerated reliability are shown in Table 3.

TABLE 1

|  | Curing temperature (° C.) | (1) Sticking force (N) | | |
| --- | --- | --- | --- | --- |
|  |  | 30 minutes | 1 hour | 2 hours |
| Example 1 | 160 | 153 | 155 | 156 |
| Example 2 | 155 | 162 | 162 | 164 |
| Example 3 | 165 | 159 | 163 | 162 |
| Example 4 | 170 | 171 | 173 | 172 |
| Example 5 | 150 | 155 | 154 | 158 |
| Example 6 | 160 | 164 | 167 | 168 |
| Comparative Example 1 | 160 | 90 | 102 | 138 |
| Comparative Example 2 | 160 | 88 | 105 | 142 |
| Comparative Example 3 | 160 | 67 | 87 | 107 |
| Comparative Example 4 | 155 | Unmeasurable | Unmeasurable | Unmeasurable |
| Comparative Example 5 | 165 | 102 | 118 | 145 |
| Comparative Example 6 | 170 | 59 | 72 | 88 |

TABLE 2

|  | Curing temperature (° C.) | (2) Extraction rate/initial | | | (2) Extraction rate/after storage for 1 month | | |
| --- | --- | --- | --- | --- | --- | --- | --- |
|  |  | 30 minutes | 1 hour | 2 hours | 30 minutes | 1 hour | 2 hours |
| Example 1 | 160 | 0.7 | 0.6 | 0.5 | 0.7 | 0.6 | 0.5 |
| Example 2 | 155 | 0.8 | 0.7 | 0.7 | 0.8 | 0.7 | 0.7 |
| Example 3 | 165 | 0.5 | 0.4 | 0.4 | 0.5 | 0.4 | 0.4 |
| Example 4 | 170 | 0.2 | 0.2 | 0.2 | 0.2 | 0.2 | 0.2 |
| Example 5 | 150 | 0.6 | 0.6 | 0.5 | 0.6 | 0.6 | 0.5 |
| Example 6 | 160 | 0.7 | 0.7 | 0.5 | 0.7 | 0.6 | 0.5 |

TABLE 2-continued

|  | Curing temperature (° C.) | (2) Extraction rate/initial | | | (2) Extraction rate/after storage for 1 month | | |
| --- | --- | --- | --- | --- | --- | --- | --- |
|  |  | 30 minutes | 1 hour | 2 hours | 30 minutes | 1 hour | 2 hours |
| Comparative Example 1 | 160 | 12.1 | 6.3 | 3.1 | 12.0 | 6.1 | 3.2 |
| Comparative Example 2 | 160 | 12.0 | 5.9 | 2.9 | 12.3 | 6.0 | 2.7 |
| Comparative Example 3 | 160 | 14.8 | 11.8 | 6.3 | 14.5 | 11.2 | 6.5 |
| Comparative Example 4 | 155 | Unmeasurable | Unmeasurable | Unmeasurable | Unmeasurable | Unmeasurable | Unmeasurable |
| Comparative Example 5 | 165 | 10.0 | 5.3 | 2.5 | 7.1 | 5.1 | 2.7 |
| Comparative Example 6 | 170 | 15.3 | 12.2 | 9.0 | 15.5 | 12.0 | 8.6 |

TABLE 3

|  |  | (3) Accelerated reliability | |
| --- | --- | --- | --- |
|  | Refrigerant/refrigerating machine oil | Flow rate retention rate (%) | Change in external appearance |
| Example 1 | R-407C/ester oil | 99 | ○ |
| Example 2 | R744 (CO$_2$)/polyalkylene glycol | 98 | ○ |
| Example 3 | R-290/polyvinyl ether | 97 | ○ |
| Example 4 | R-1270/polyvinyl ether | 99 | ○ |
| Example 5 | R717 (ammonia)/polyalkylene glycol | 97 | ○ |
| Example 6 | R-134a/ester oil | 99 | ○ |
| Comparative Example 1 | R-407C/ester oil | 84 | X |
| Comparative Example 2 | R-407C/ester oil | 85 | X |
| Comparative Example 3 | R-407C/ester oil | 83 | X |
| Comparative Example 4 | R744 (CO$_2$)/polyalkylene glycol | Unmeasurable | Unmeasurable |
| Comparative Example 5 | R-290/polyvinyl ether | 87 | Δ |
| Comparative Example 6 | R-1270/polyvinyl ether | 81 | X |

As is apparent from Table 1, each of the solvent-free varnish compositions of Examples 1 to 6 provided a cured product showing a sticking force of 150 N or more, which was an acceptance criterion, in a heating time of 30 minutes, and the sticking force of the cured product remained substantially unchanged even when the heating time was lengthened. In addition, as is apparent from Table 2, each of the solvent-free varnish compositions of Examples 1 to 5 provided a cured product showing an extraction rate of less than 1% in a curing time of 30 minutes, and the extraction rate of the cured product remained substantially unchanged even when the heating time was lengthened. The tendency was similarly observed even in the case where a solvent-free varnish composition after 1 month of storage was used. Those results show that the curing reaction of each of the solvent-free varnish compositions is completed by a heat treatment in a time period as short as 30 minutes.

Further, as is apparent from Table 3, in each of the closed electric compressors produced by using the solvent-free varnish compositions of Examples 1 to 5, the flow rate retention rate of the restricting portion showed a high value of 97% or more, and the flow rate of the restricting portion was substantially free from reducing. In addition, no sludge production or the like was observed in the expansion valve and the piping line, and hence the external appearance of each of the expansion valve and the piping line showed no change.

In contrast, the solvent-free varnish composition of Comparative Example 1 was free of the thermosetting resin (B) and the curing catalyst for an epoxy resin, and hence its curing rate was slow and its curing reaction was not completed in a curing time of 2 hours or less. Probably as a result of the foregoing, the solvent-free varnish composition of Comparative Example 1 provided a cured product having a low sticking force and a high extraction rate. In addition, in the closed electric compressor produced by using the solvent-free varnish composition of Comparative Example 1, the curing of the solvent-free varnish composition was insufficient. Accordingly, a large amount of sludge was produced in the expansion valve and the piping line, and hence a change in external appearance of each of the expansion valve and the piping line was observed. In addition, a reduction in flow rate of the restricting portion was large.

The solvent-free varnish composition of Comparative Example 2 contained the curing catalyst for an epoxy resin, but was free of the thermosetting resin (B). Accordingly, the curing catalyst for an epoxy resin was substantially free from contributing to the curing reaction, and hence the curing rate was slow and the curing reaction was not completed in a curing time of 2 hours or less. Probably as a result of the foregoing, even in the case where the solvent-free varnish composition of Comparative Example 2 was used, results similar to those in the case where the solvent-free varnish composition of Comparative Example 1 was used were obtained.

The solvent-free varnish composition of Comparative Example 3 contained the thermosetting resin (B), but was free of the curing catalyst for an epoxy resin. Accordingly, an addition reaction involving an epoxy group of the thermosetting resin (B) did not advance, and hence the curing rate was slow and the curing reaction was not completed in a curing time of 2 hours or less. As a result, even in the case where the solvent-free varnish composition of Comparative Example 3 was used, results similar to those in the case where the solvent-free varnish composition of Comparative Example 1 was used were obtained.

In the solvent-free varnish composition of Comparative Example 4, the organic peroxide having a 10-hour half-life temperature of 36° C. (cumyl peroxyneodecanoate) was used. Accordingly, a curing reaction advanced at the time of the initiation of stirring after the loading of the respective raw materials at room temperature, and the solvent-free varnish composition changed into a high-viscosity gel-like product at the time of the completion of the mixing. Therefore, various evaluations could not be performed.

In the solvent-free varnish composition of Comparative Example 5, the epoxy equivalent in the mixed resin was as high as about 9,000 (i.e., the amount of an epoxy group present in the solvent-free varnish composition was large, and the amount of the thermosetting resin (A) having methacryloyl groups was extremely small). When the reaction rate of a radical reaction through a methacryloyl group and that of an addition reaction through an epoxy group are compared to each other, the former was relatively higher than the latter. In the solvent-free varnish composition of Comparative Example 5, however, the addition reaction through an epoxy group becomes dominant to cause a reduction in curing rate. Accordingly, the curing rate of the solvent-free varnish composition of Comparative Example 5 was slow and the curing reaction was not completed in a curing time of 2 hours or less. As a result, even in the case where the solvent-free varnish composition of Comparative Example 5 was used, results similar to those in the case where the solvent-free varnish composition of Comparative Example 1 was used were obtained.

The solvent-free varnish composition of Comparative Example 6 had an epoxy equivalent as small as about 450 (i.e., the amount of an epoxy group present in the solvent-free varnish composition was small). Accordingly, an addition reaction through an epoxy group did not sufficiently occur, and hence the curing rate did not increase. Accordingly, even in the case where the solvent-free varnish composition of Comparative Example 6 was used, results similar to those in the case where the solvent-free varnish composition of Comparative Example 1 was used were obtained.

Example 7

A stator coil for a fan motor obtained by arranging a winding wire on a stator core for a fan motor was preheated and air-cooled. After that, the stator coil for a fan motor was dipped in the solvent-free varnish composition of Example 1 stored in an impregnation tank to be impregnated therewith. Next, any unnecessary solvent-free varnish composition was removed by dripping the composition from the stator coil for a fan motor. After that, the remaining composition was thermally cured at 160° C. for 30 minutes. Thus, a stator coil for a fan motor subjected to an impregnation treatment was obtained.

Next, a heat generation temperature was measured by a coil energization test, and the inside of the stator coil for a fan motor was observed. The coil energization test was performed under the conditions of 100 V, 4 A, and 10 minutes.

In the coil energization test, the heat generation temperature was 50° C., i.e., no significant increase was observed, and hence a satisfactory result was obtained. This is probably because of the following reason: the coil was sufficiently stuck by the cured product of the solvent-free varnish composition, and hence heat generated in the winding wire at the time of the energization was rapidly transferred to the core and the heat generation was suppressed. In addition, as a result of the observation of the inside of the coil, it was confirmed that the solvent-free varnish composition was sufficiently impregnated even into fine voids.

Example 8

A power transformer coil obtained by arranging a winding wire on a transformer core was preheated and air-cooled. After that, the power transformer coil was dipped in the solvent-free varnish composition of Example 4 stored in an impregnation tank to be impregnated therewith. Next, any unnecessary solvent-free varnish composition was removed by dripping the composition from the power transformer coil. After that, the remaining composition was thermally cured at 170° C. for 30 minutes. Thus, a power transformer coil subjected to an impregnation treatment was obtained.

As a result of the observation of the inside of the resultant power transformer coil, it was confirmed that the solvent-free varnish composition was sufficiently impregnated even into fine voids. In addition, each slot portion of the coil to which the solvent-free varnish composition was stuck was cut out and the sticking property was evaluated with a precision universal tester. As a result, it was confirmed that it had a sufficient mechanical strength.

As can be seen from the foregoing results, according to the present invention, there can be provided a solvent-free varnish composition that can be used as an insulating varnish that shows small energy loss and requires a short curing time in its curing treatment step, and that provides a cured product that barely causes the precipitation of an oligomer or the like even when exposed to a refrigerant-based environment containing a refrigerant and a refrigerating machine oil under high temperature and high pressure. In addition, according to the present invention, there can be provided an insulated coil that barely causes the precipitation of an oligomer or the like even when exposed to a refrigerant-based environment containing a refrigerant and a refrigerating machine oil under high temperature and high pressure, and a method of producing the coil. Further, according to the present invention, there can be provided a rotating machine and a closed electric compressor each having high reliability, the rotating machine and the closed electric compressor each barely causing insulation deterioration, and each being capable of suppressing the clogging of a restricting portion, such as a capillary tube or an expansion valve.

EXPLANATION ON NUMERALS

1 Closed vessel
2 Motor element
3 Compression element
4 Refrigerating machine oil
5 Crankshaft
6 Magnet wire
7 Compression power terminal
8 Core
9 Slot
10 Insulating film
11 Binding thread
12 Insulating varnish

The invention claimed is:
1. A solvent-free varnish composition, comprising:
a thermosetting resin (A) having two or more (meth)acryloyl groups in a molecule thereof;
a thermosetting resin (B) having both an epoxy group and a (meth)acryloyl group in a molecule thereof, wherein the thermosetting resin (B) is at least one selected from the group consisting of:

a compound represented by formula (IV):

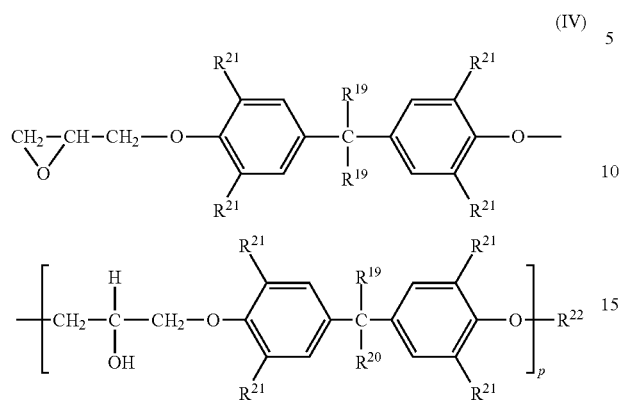

wherein in the formula (IV), $R^{19}$ and $R^{20}$ each independently represent H or $CH_3$, $R^{21}$ represents H or Br, $R^{22}$ represents a group represented by formula (i) or (ii)

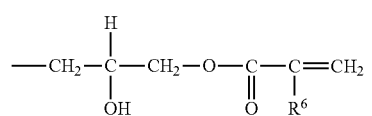

wherein in the formula (i), $R^6$ represents H or $CH_3$,

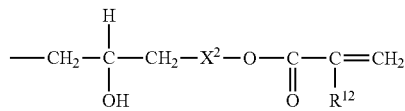

wherein in the formula (ii), $R^{12}$ represents H or $CH_3$, $X_2$ in the formula (ii) represents a divalent group having 1 to 20 carbon atoms and 0 to 6 oxygen atoms, the divalent group comprising at least one group selected from the group consisting of an aromatic hydrocarbon group, a saturated or unsaturated alicyclic hydrocarbon group, and a linear or branched, saturated or unsaturated aliphatic hydrocarbon group, and p represents an integer of from 0 to 50; and a compound represented by formula (V):

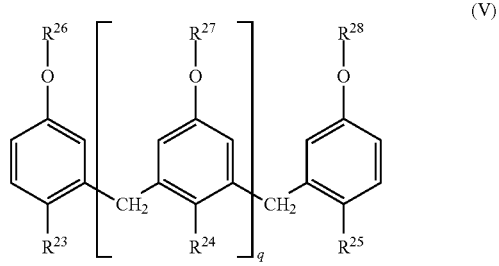

wherein in the formula (V), $R^{23}$, $R^{24}$, and $R^{25}$ each independently represent H or $CH_3$, $R^{26}$, $R^{27}$, and $R^{28}$ each represent a (meth)acryloyl group represented by the formula (i) or (ii), or an epoxy group represented by the formula (iii):

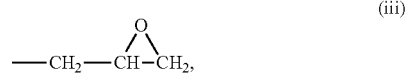

and at least one of $R^{26}$, $R^{27}$, or $R^{28}$ is a (meth)acryloyl group represented by the formula (i) or (ii), and q represents an integer of from 1 to 50;

a monofunctional vinyl-based monomer having an ether bond or an ester bond;

an organic peroxide having a 10-hour half-life temperature of 40° C. or more; and a curing catalyst adapted for curing an epoxy resin, wherein a mixed resin of the thermosetting resin (A) and the thermosetting resin (B) has an epoxy equivalent of from 500 to 5,000.

2. The solvent-free varnish composition according to claim 1, wherein the thermosetting resin (A) is at least one selected from the group consisting of:

a compound represented by formula (I):

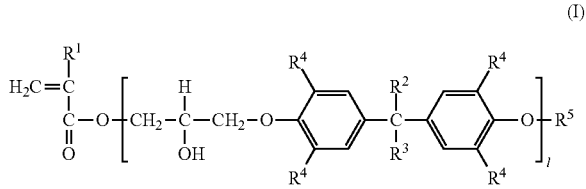

wherein in the formula (I), $R^1$, $R^2$, and $R^3$ each independently represent H or $CH_3$, $R^4$ represents H or Br, $R^5$ represents a (meth)acryloyl group represented by formula (i):

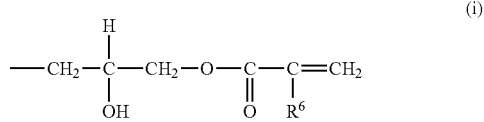

wherein in the formula (i), $R^6$ represents H or $CH_3$, and l represents an integer of from 1 to 50;

a compound represented by formula (II):

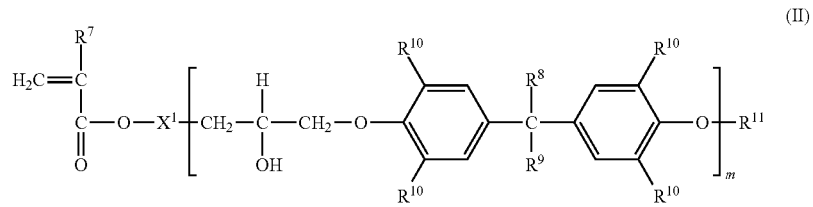

wherein in the formula (II), $R^7$, $R^8$, and $R^9$ each independently represent H or $CH_3$, $R^{10}$ represents H or Br, $R^{11}$ represents a (meth)acryloyl group represented by formula (ii):

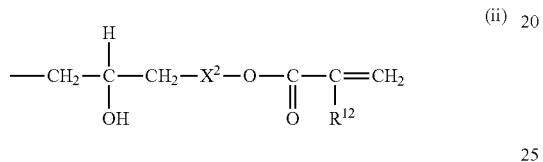

wherein in the formula (ii), $R^{12}$ represents H or $CH_3$, $X^1$ in the formula (II) and $X^2$ in the formula (ii) each independently represent a divalent group having 1 to 20 carbon atoms and 0 to 6 oxygen atoms, the divalent group comprising at least one group selected from the group consisting of an aromatic hydrocarbon group, a saturated or unsaturated alicyclic hydrocarbon group, and a linear or branched, saturated or unsaturated aliphatic hydrocarbon group, and m represents an integer of from 1 to 50; and a compound represented by formula (III):

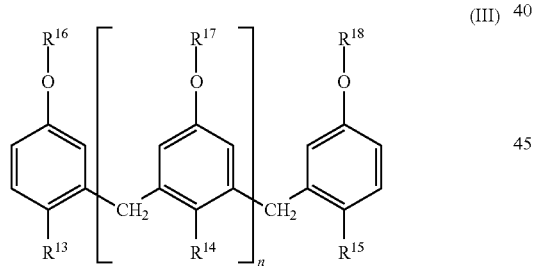

wherein in the formula (III), $R^{13}$, $R^{14}$, and $R^{15}$ each independently represent H or $CH_3$, $R^{16}$, $R^{17}$, and $R^{18}$ each represent a (meth)acryloyl group represented by the general formula (i) or (ii), and n represents an integer of from 1 to 50.

3. The solvent-free varnish composition according to claim 1, wherein the monofunctional vinyl-based monomer having an ether bond or an ester bond is a compound represented by formula (VI):

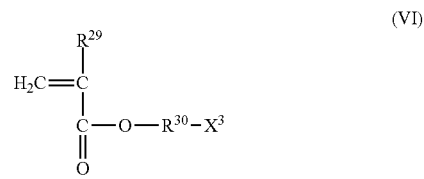

wherein in the formula (VI), $R^{29}$ represents a hydrogen atom or an alkyl group having 1 to 5 carbon atoms, $R^{30}$ represents $—(CH_2)_s—$, where s represents an integer of from 1 to 10, or $—(CH(R^{31})O)_t—$, where $R^{31}$ represents a hydrogen atom or an alkyl group having 1 to 5 carbon atoms, and t represents an integer of from 1 to 10, and $X^3$ represents H, OH, or $OCO(R^{32})$, where $R^{32}$ represents an alkyl group having 1 to 5 carbon atoms.

4. The solvent-free varnish composition according to claim 1, wherein the 10-hour half-life temperature of the organic peroxide is 80° C. or more, and is equal to or less than a curing temperature of the solvent-free varnish composition.

5. The solvent-free varnish composition according to claim 1, wherein the curing catalyst is at least one selected from the group consisting of a tertiary amine, a tertiary amine salt, a borate, a Lewis acid, an organometallic compound, an organic phosphorus-based compound, a quaternary ammonium salt, a quaternary phosphonium salt, an amine complex, and an imidazole-based compound.

6. A solvent-free varnish composition, comprising:
a thermosetting resin (A) having two or more (meth)acryloyl groups in a molecule thereof;
a thermosetting resin (B) having both an epoxy group and a (meth)acryloyl group in a molecule thereof, wherein the thermosetting resin (B) is at least one selected from the group consisting of:
a compound represented by formula (IV):

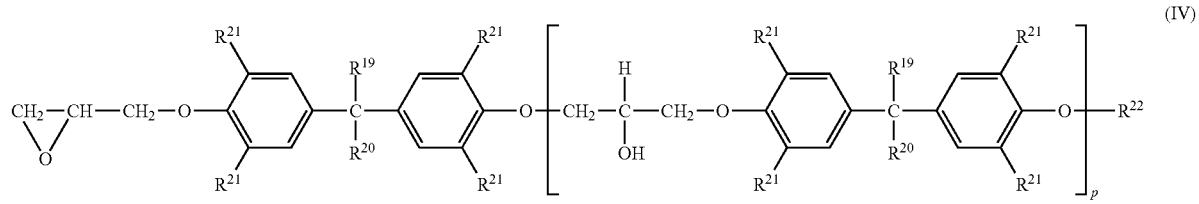

wherein in the formula (IV), $R^{19}$ and $R^{20}$ each independently represent H or $CH_3$, $R^{21}$ represents H or Br, $R^{22}$ represents a group represented by formula (i) or (ii):

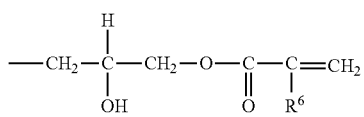
(i)

wherein in the formula (i), $R^6$ represents H or $CH_3$,

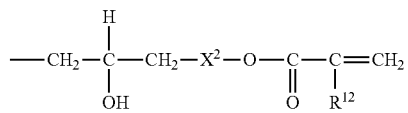
(ii)

wherein in the formula (ii), $R^{12}$ represents H or $CH_3$, $X_2$ in the formula (ii) represents a divalent group having 1 to 20 carbon atoms and 0 to 6 oxygen atoms, the divalent group comprising at least one group selected from the group consisting of an aromatic hydrocarbon group, a saturated or unsaturated alicyclic hydrocarbon group, and a linear or branched, saturated or unsaturated aliphatic hydrocarbon group, and p represents an integer of from 0 to 50; and a compound represented by formula (V):

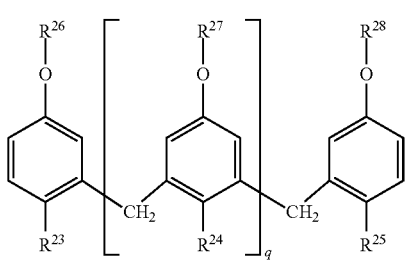
(V)

wherein in the formula (V), $R^{23}$, $R^{24}$, and $R^{25}$ each independently represent H or $CH_3$, $R^{26}$, $R^{27}$, and $R^{28}$ each represent a (meth)acryloyl group represented by the formula (i) or (ii), or an epoxy group represented by the formula (iii):

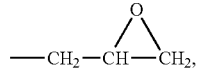
(iii)

and at least one of $R^{26}$, $R^{27}$, or $R^{28}$ is a (meth)acryloyl group represented by the formula (i) or (ii), and q represents an integer of from 1 to 50;

a monofunctional vinyl-based monomer having an ether bond or an ester bond;

an organic peroxide having a 10-hour half-life temperature of 40° C. or more; and a curing catalyst adapted for curing an epoxy resin, and a polyfunctional vinyl-based monomer having two or more (meth)acryloyl groups or allyl groups in a molecule thereof;

wherein a mixed resin of the thermosetting resin (A) and the thermosetting resin (B) has an epoxy equivalent of from 500 to 5,000.

7. The solvent-free varnish composition according to claim 6, wherein the thermosetting resin (A) is at least one selected from the group consisting of:

a compound represented by formula (I):

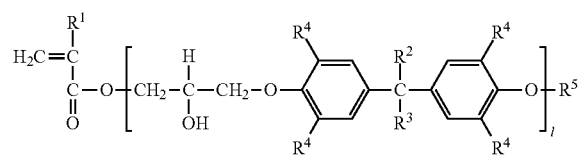
(I)

wherein in the formula (I), $R^1$, $R^2$, and $R^3$ each independently represent H or $CH_3$, $R^4$ represents H or Br, $R^5$ represents a (meth)acryloyl group represented by formula (i):

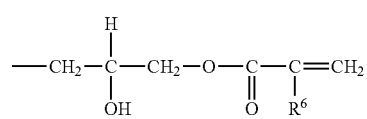
(i)

wherein in the formula (i), $R^6$ represents H or $CH_3$, and l represents an integer of from 1 to 50;

a compound represented by formula (II):

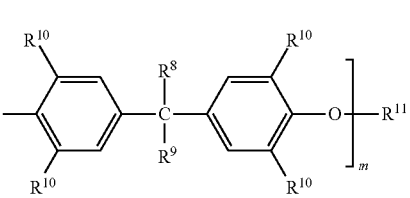
(II)

wherein in the formula (II), $R^7$, $R^8$, and $R^9$ each independently represent H or $CH_3$, $R^{10}$ represents H or Br, $R^{11}$ represents a (meth)acryloyl group represented by formula (ii):

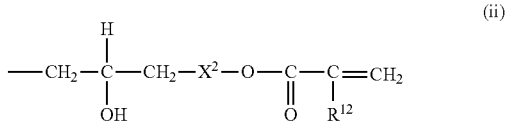

(ii)

wherein in the formula (ii), $R^{12}$ represents H or $CH_3$, $X^1$ in the formula (II) and $X^2$ in the formula (ii) each independently represent a divalent group having 1 to 20 carbon atoms and 0 to 6 oxygen atoms, the divalent group comprising at least one group selected from the group consisting of an aromatic hydrocarbon group, a saturated or unsaturated alicyclic hydrocarbon group, and a linear or branched, saturated or unsaturated aliphatic hydrocarbon group, and m represents an integer of from 1 to 50; and a compound represented by formula (III):

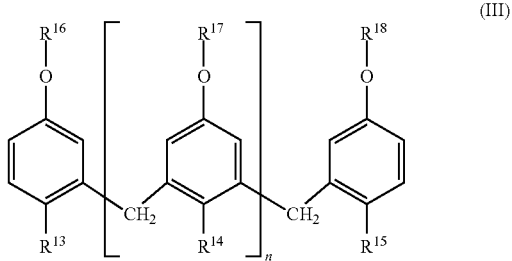

(III)

wherein in the formula (III), $R^{13}$, $R^{14}$, and $R^{15}$ each independently represent H or $CH_3$, $R^{16}$, $R^{17}$, and $R^{18}$ each represent a (meth)acryloyl group represented by the general formula (i) or (ii), and n represents an integer of from 1 to 50.

8. The solvent-free varnish composition according to claim 6, wherein the monofunctional vinyl-based monomer having an ether bond or an ester bond is a compound represented by formula (VI):

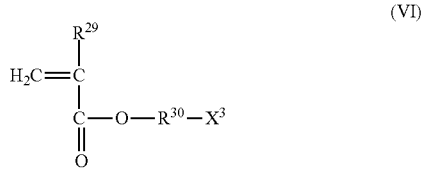

(VI)

wherein in the formula (VI), $R^{29}$ represents a hydrogen atom or an alkyl group having 1 to 5 carbon atoms, $R^{30}$ represents $-(CH_2)_s-$, where s represents an integer of from 1 to 10, or $-(CH(R^{31})O)_t-$, where $R^{31}$ represents a hydrogen atom or an alkyl group having 1 to 5 carbon atoms, and t represents an integer of from 1 to 10, and $X^3$ represents H, OH, or $OCO(R^{32})$, where $R^{32}$ represents an alkyl group having 1 to 5 carbon atoms.

9. The solvent-free varnish composition according to claim 6, wherein the 10-hour half-life temperature of the organic peroxide is 80° C. or more, and is equal to or less than a curing temperature of the solvent-free varnish composition.

10. The solvent-free varnish composition according to claim 6, wherein the curing catalyst is at least one selected from the group consisting of a tertiary amine, a tertiary amine salt, a borate, a Lewis acid, an organometallic compound, an organic phosphorus-based compound, a quaternary ammonium salt, a quaternary phosphonium salt, an amine complex, and an imidazole-based compound.

11. A solvent-free varnish composition, comprising:

a thermosetting resin (A) having two or more (meth)acryloyl groups in a molecule thereof, wherein the thermosetting resin (A) is at least one selected from the group consisting of:

a compound represented by formula (I):

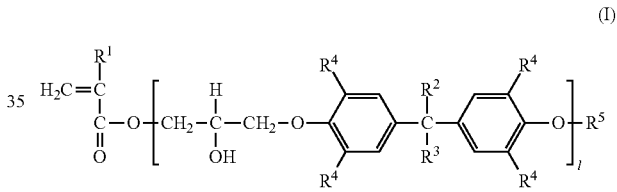

(I)

wherein in the formula (I), $R^1$, $R^2$, and $R^3$ each independently represent H or $CH_3$, $R^4$ represents H or Br, $R^5$ represents a (meth)acryloyl group represented by formula (i):

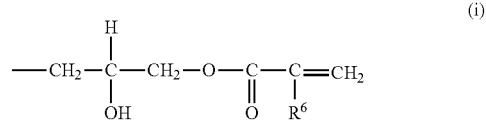

(i)

wherein in the formula (i), $R^6$ represents H or $CH_3$, and l represents an integer of from 1 to 50;

a compound represented by formula (II):

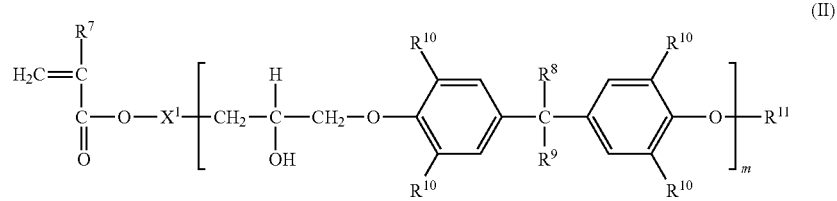

(II)

wherein in the formula (II), $R^7$, $R^8$, and $R^9$ each independently represent H or $CH_3$, $R^{10}$ represents H or Br, $R^{11}$ represents a (meth)acryloyl group represented by formula (ii):

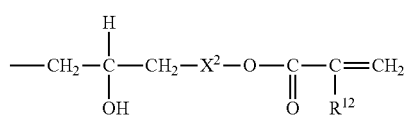

(ii)

wherein in the formula (ii), $R^{12}$ represents H or $CH_3$, $X^1$ in the formula (II) and $X^2$ in the formula (ii) each independently represent a divalent group having 1 to 20 carbon atoms and 0 to 6 oxygen atoms, the divalent group comprising at least one group selected from the group consisting of an aromatic hydrocarbon group, a saturated or unsaturated alicyclic hydrocarbon group, and a linear or branched, saturated or unsaturated aliphatic hydrocarbon group, and m represents an integer of from 1 to 50; and a compound represented by formula (III):

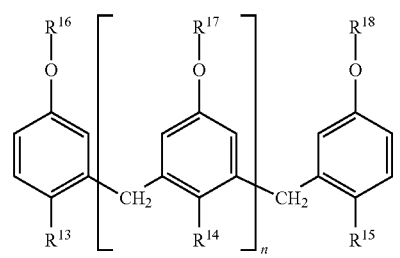

(III)

wherein in the formula (III), $R^{13}$, $R^{14}$, and $R^{15}$ each independently represent H or $CH_3$, $R^{16}$, $R^{17}$, and $R^{18}$ each represent a (meth)acryloyl group represented by the general formula (i) or (ii), and n represents an integer of from 1 to 50;

a thermosetting resin (B) having both an epoxy group and a (meth)acryloyl group in a molecule thereof, wherein the thermosetting resin (B) is at least one selected from the group consisting of:

a compound represented by formula (IV):

wherein in the formula (IV), $R^{19}$ and $R^{20}$ each independently represent H or $CH_3$, $R^{21}$ represents H or Br, $R^{22}$ represents a group represented by formula (i) or (ii):

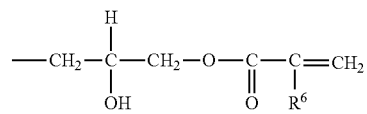

(i)

wherein in the formula (i), $R^6$ represents H or $CH_3$,

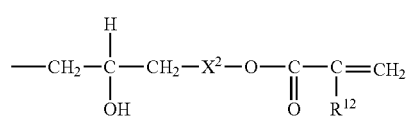

(ii)

wherein in the formula (ii), $R^{12}$ represents H or $CH_3$, $X_2$ in the formula (ii) represents a divalent group having 1 to 20 carbon atoms and 0 to 6 oxygen atoms, the divalent group comprising at least one group selected from the group consisting of an aromatic hydrocarbon group, a saturated or unsaturated alicyclic hydrocarbon group, and a linear or branched, saturated or unsaturated aliphatic hydrocarbon group, and p represents an integer of from 0 to 50; and a compound represented by formula (V):

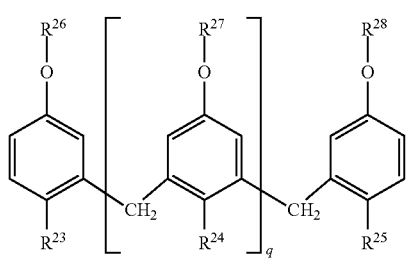

(V)

wherein in the formula (V), $R^{23}$, $R^{24}$, and $R^{25}$ each independently represent H or $CH_3$, $R^{26}$, $R^{27}$, and $R^{28}$ each represent a (meth)acryloyl group represented by the formula (i) or (ii), or an epoxy group represented by the formula (iii):

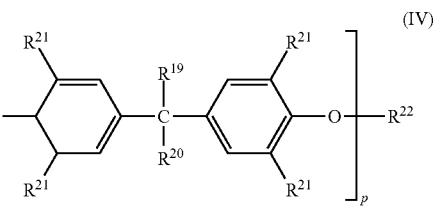

(IV)

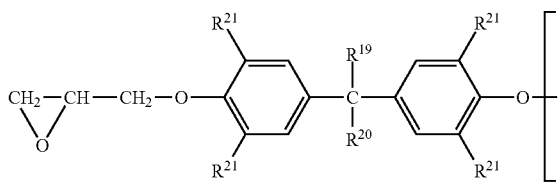

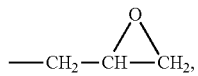

and at least one of $R^{26}$, $R^{27}$, or $R^{28}$ is a (meth)acryloyl group represented by the formula (i) or (ii), and q represents an integer of from 1 to 50;
  a monofunctional vinyl-based monomer having an ether bond or an ester bond;
  an organic peroxide having a 10-hour half-life temperature of 40° C. or more; and
  a curing catalyst adapted for curing an epoxy resin,
  wherein a mixed resin of the thermosetting resin (A) and the thermosetting resin (B) has an epoxy equivalent of from 500 to 5,000.

12. The solvent-free varnish composition according to claim 11, wherein the monofunctional vinyl-based monomer having an ether bond or an ester bond is a compound represented by formula (VI):

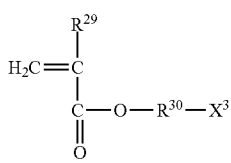

wherein in the formula (VI), $R^{29}$ represents a hydrogen atom or an alkyl group having 1 to 5 carbon atoms, $R^{30}$ represents $-(CH_2)_s-$, where s represents an integer of from 1 to 10, or $-(CH(R^{31})O)_t-$, where $R^{31}$ represents a hydrogen atom or an alkyl group having 1 to 5 carbon atoms, and t represents an integer of from 1 to 10, and $X^3$ represents H, OH, or $OCO(R^{32})$, where $R^{32}$ represents an alkyl group having 1 to 5 carbon atoms.

13. The solvent-free varnish composition according to claim 11, wherein the 10-hour half-life temperature of the organic peroxide is 80° C. or more, and is equal to or less than a curing temperature of the solvent-free varnish composition.

14. The solvent-free varnish composition according to claim 11, wherein the curing catalyst is at least one selected from the group consisting of a tertiary amine, a tertiary amine salt, a borate, a Lewis acid, an organometallic compound, an organic phosphorus-based compound, a quaternary ammonium salt, a quaternary phosphonium salt, an amine complex, and an imidazole-based compound.

* * * * *